United States Patent
Riley et al.

(10) Patent No.: US 9,686,510 B1
(45) Date of Patent: Jun. 20, 2017

(54) SELECTABLE INTERACTION ELEMENTS IN A 360-DEGREE VIDEO STREAM

(71) Applicant: Microsoft Technology Licensing, LLC, Redmond, WA (US)

(72) Inventors: Raymond Walter Riley, Bainbridge Island, WA (US); Kae-Ling Gurr, Seattle, WA (US); Brett Delainey Christie, Seattle, WA (US); Joshua D. Maruska, Seattle, WA (US); Joshua Noble, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/071,149

(22) Filed: Mar. 15, 2016

(51) Int. Cl.
  H04N 7/14 (2006.01)
  H04N 7/15 (2006.01)
  H04N 5/232 (2006.01)

(52) U.S. Cl.
  CPC ........... *H04N 7/15* (2013.01); *H04N 5/23238* (2013.01); *H04N 7/142* (2013.01)

(58) Field of Classification Search
  CPC ....................................................... H04N 7/14
  USPC .......... 348/14.01, 14.03, 14.04, 14.07, 14.08
  See application file for complete search history.

(56) References Cited

U.S. PATENT DOCUMENTS

| 8,111,282 | B2 | 2/2012 | Cutler et al. | |
|---|---|---|---|---|
| 8,125,509 | B2 * | 2/2012 | Kenoyer | H04N 7/147 348/14.08 |
| 8,537,196 | B2 | 9/2013 | Hegde et al. | |
| 8,624,955 | B2 | 1/2014 | Watson et al. | |
| 8,625,754 | B1 * | 1/2014 | Croak | 379/93.01 |
| 8,670,018 | B2 | 3/2014 | Cunnington et al. | |
| 8,791,977 | B2 * | 7/2014 | Marvit | H04N 7/15 348/14.01 |
| 8,798,252 | B2 | 8/2014 | Krantz et al. | |
| 9,064,160 | B2 * | 6/2015 | Norlin | G06K 9/00221 |
| 9,118,804 | B2 * | 8/2015 | Kim | H04L 65/1069 |
| 9,386,270 | B2 * | 7/2016 | Griffin | H04L 12/1822 |
| 2004/0254982 | A1 | 12/2004 | Hoffman et al. | |
| 2009/0210789 | A1 | 8/2009 | Thakkar et al. | |
| 2009/0220065 | A1 | 9/2009 | Ahuja et al. | |
| 2012/0079399 | A1 | 3/2012 | Ferman et al. | |
| 2012/0081503 | A1 * | 4/2012 | Leow | H04N 7/142 348/14.07 |
| 2013/0162752 | A1 * | 6/2013 | Herz | H04N 7/15 348/14.08 |
| 2013/0169742 | A1 | 7/2013 | Wu et al. | |

(Continued)

OTHER PUBLICATIONS

"Integrating the Polycom CX5000 with Polycom Video Systems", In White Paper of Polycom, Apr. 2009, pp. 1-18.

*Primary Examiner* — Olisa Anwah

(74) *Attorney, Agent, or Firm* — Wade IP Law LLC

(57) ABSTRACT

Techniques are described herein that are capable of providing selectable interaction elements in a 360-degree video stream. A selectable interaction element is an element (e.g., user interface element) for which selection of the element initiates the providing of information pertaining to an object with which the element is associated. For instance, the selectable interaction element may be positioned proximate the object in the 360-degree video stream (e.g., a portion of the 360-degree video stream or an entirety of the 360-degree video stream). Examples of a user interface element include but are not limited to text, an icon, and a widget.

20 Claims, 8 Drawing Sheets

(56) References Cited

U.S. PATENT DOCUMENTS

2014/0104374 A1  4/2014  Buckler
2014/0118472 A1  5/2014  Liu et al.
2015/0049162 A1  2/2015  Kurupacheril et al.
2015/0179186 A1  6/2015  Swierk et al.

* cited by examiner

SELECTABLE INTERACTION ELEMENTS IN A 360-DEGREE VIDEO STREAM

BACKGROUND 360-degree video systems have become increasingly popular in recent years. A 360-degree video system includes a 360-degree video camera that captures a 360-degree image of an environment. The 360-degree video system may provide access to the 360-degree image through the Internet for display on remote viewers' personal computers, for example.

One example type of environment in which 360-degree video systems have been used is a video conferencing environment. For instance, a 360-degree video system may be incorporated into a video conferencing system, which enables participants of a video conference who are at different locations to communicate using two-way video and audio transmissions. The video conference may be hosted by participants in a conference room (a.k.a. in-room participants) in which a 360-degree video camera is located, and the video conferencing system may enable the in-room participants to communicate in real-time with other participants (e.g., remote participants) who are not in the conference room. The 360-degree video camera captures images of the in-room participants, which may be shown on displays of the other participants' computers to facilitate communication between the in-room participants and the other participants.

Conventional 360-degree video systems often restrict a user experience of remote users (e.g., the aforementioned other participants of a video conference) to merely viewing the 360-degree image or selecting between the 360-degree image and other images (e.g., an image that focuses on a particular in-room participant of a video conference).

SUMMARY

Various approaches are described herein for, among other things, providing selectable interaction elements in a 360-degree video stream. A selectable interaction element is an element (e.g., user interface element) for which selection of the element initiates the providing of information pertaining to an object with which the element is associated. For instance, the selectable interaction element may be positioned proximate the object in the 360-degree video stream (e.g., a portion of the 360-degree video stream or an entirety of the 360-degree video stream). Examples of a user interface element include but are not limited to text, an icon, and a widget.

In an example approach, objects in a 360-degree view that is captured by a 360-degree video camera are automatically identified. The selectable interaction elements, which are configured to be incorporated into a 360-degree video stream that is generated from the 360-degree view, are associated with the respective objects. Each selectable interaction element is selectable to provide information pertaining to the object with which the respective selectable interaction element is associated. One or more selectable interaction elements are incorporated into at least a portion of the 360-degree video stream such that the one or more selectable interaction elements are positioned proximate one or more respective objects with which the one or more respective selectable interaction elements are associated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
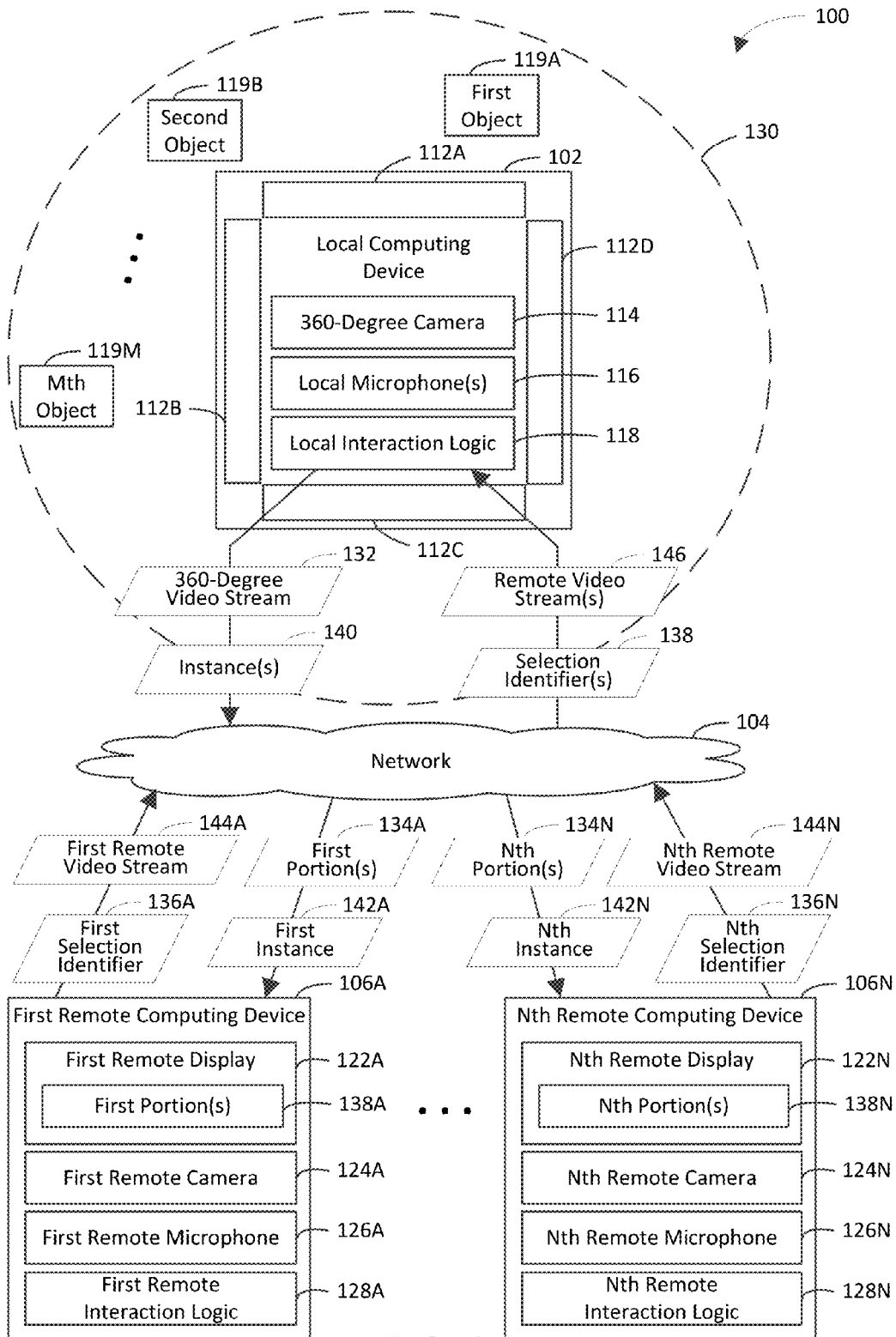
FIG. 1 is a block diagram of an example interaction system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing selectable interaction elements in a 360-degree video stream. A selectable interaction element is an element (e.g., user interface element) for which selection of the element initiates the providing of information pertaining to an object with which the element is associated. For instance, the selectable interaction element may be positioned proximate the object in the 360-degree video stream (e.g., a portion of the 360-degree video stream or an entirety of the 360-degree video stream). Examples of a user interface element include but are not limited to text, an icon, and a widget.

Example techniques described herein have a variety of benefits as compared to conventional techniques for providing a 360-degree video stream. For instance, the example techniques may increase efficiency of communication among persons who are shown in the 360-degree video stream (e.g., local participants of a video conference) and viewers of the 360-degree video stream who are not shown in the 360-degree video stream (e.g., remote participants of the video conference). The example techniques may increase user efficiency in any of a variety of ways, including but not limited to increasing an ability of a viewer to identify persons shown in the 360-degree video stream (e.g., speakers in a video conference and participants to whom the speakers speak), to obtain information about such persons, to view and/or control content that is being provided in an environment in which a 360-degree video camera is located, to send messages to persons shown in the 360-degree video stream, etc. The example embodiments may be capable of providing a raw copy of content that is being provided in the environment. For instance, it may be beneficial to provide the raw copy if clarity of the content in the 360-degree video stream is compromised (e.g., the content in the 360-degree video stream is blurry or of relatively low resolution) and/or occluded by other objects in the 360-degree video stream. The example embodiments may enable a viewer to change a perspective from which the viewer views the environment (e.g., from the center of a room to a corner or wall of the room and vice versa).

The example techniques may increase efficiency of a first computing device that provides a 360-degree video stream to a viewer of the 360-degree video stream and/or a second computing device of the viewer that processes the 360-degree video stream for display to the viewer. The example techniques may reduce an amount of time and/or resources (e.g., processor, memory, network bandwidth) that are consumed to provide the 360-degree video stream and associated information (e.g., content) to viewers of the 360-degree video stream. For example, the 360-degree video stream and/or all such information need not necessarily be provided from the first computing device to the second computing device. In accordance with this example, the 360-degree video stream (e.g., a portion thereof) and/or the information may be selectively provided from the first device to the second device based on selection of selectable interface element(s) that are incorporated into the 360-degree video stream.

FIG. 1 is a block diagram of an example interaction system 100 in accordance with an embodiment. Generally speaking, interaction system 100 operates to provide selectable interaction elements in a 360-degree video stream. As shown in FIG. 1, interaction system 100 includes a local computing device 102, a network 104, and a plurality of remote computing devices 106A-106N. Communication among local computing device 102 and remote computing devices 106A-106N is carried out over network 104 using well-known network communication protocols. Network 104 may be a wide-area network (e.g., the Internet), a local area network (LAN), another type of network, or a combination thereof.

Local computing device 102 is a processing system that is capable of communicating with remote computing devices 106A-106N. An example of a processing system is a system that includes at least one processor that is capable of manipulating data in accordance with a set of instructions. For instance, a processing system may be a computer, a game console, a personal digital assistant, etc. In an example video conferencing embodiment, local computing device 102 is a video conference device, which is configured to facilitate communication among participants of a video conference. Local computing device 102 includes displays 112A-112D, a 360-degree camera 114, local microphone(s) 116, and local interaction logic 118. Displays 112A-112D are configured to display remote video stream(s) 146. Remote video stream(s) 146 include one or more of remote video streams 144A-144N, which are provided by respective remote computing devices 106A-106N.

360-degree camera 114 is configured to capture a 360-degree view, which includes a plurality of objects 119A-119M that are within a field of view 130 of 360-degree camera 114. Examples of an object that may be included in the plurality of objects 119A-119M include but are not limited to a person, a camera, a computing device, a display (e.g., an active display), and a white board (e.g., a chalk board). 360-degree camera 114 is further configured to generate a 360-degree video stream 132 from the 360-degree view. The 360-degree video stream 132 includes one or more portions. For instance, each portion of the 360-degree video stream 132 may be separated from others of the portions so that the respective portion may be viewed independently from the other portions at one or more remote computing devices of the plurality of remote computing devices 106A-106N.

In the example video conferencing embodiment, the plurality of objects 119A-119M includes participant(s) of the video conference who are within the field of view 130 of 360-degree camera 114. Each participant of the video conference who is within the field of view 130 is referred to herein as a "local participant" for illustrative purposes and is not intended to be limiting. For instance, the local participant(s) may be in a conference room. In one example, the field of view 130 may extend a designated (e.g., predetermined) radius from 360-degree camera 114. In another example, the field of view 130 may extend to the walls of a room in which the local participant(s) are located. Participants of the video conference who are associated with remote computing devices 106A-106N are not within the field of view 130 of 360-degree camera 114. The participants who are associated with remote computing devices 106A-106N are referred to herein as "remote participants" for illustrative purposes and are not intended to be limiting.

Local microphone(s) 116 are configured to receive speech of persons (e.g., local participants of a video conference) and other sounds that are audible to a human (e.g., frequencies in a range of 20 Hertz to 20,000 Hertz).

Local interaction logic 118 is configured to perform one or more of the operations described herein to provide selectable interaction elements in a 360-degree video stream (e.g., 360-degree video stream 132 or any one or more of portion(s) 134A-134N). For instance, local interaction logic 118 may automatically identify objects in a 360-degree view that is captured by 360-degree camera 114. Local interaction logic 118 may associate the selectable interaction elements with the respective objects. The selectable interaction elements are configured to be incorporated into 360-degree video stream 132. Each selectable interaction element is selectable to provide information pertaining to the object with which the respective selectable interaction element is associated. Local interaction logic 118 may incorporate one or more selectable interaction elements into at least a portion of the 360-degree video stream 132 such that the one or more selectable interaction elements are positioned proximate one or more respective objects with which the one or more respective selectable interaction elements are associated.

For instance, local interaction logic 118 may incorporate first selectable interaction element(s) into first portion(s) 134A, second selectable interaction element(s) into second portion(s) (not shown), and so on. The first selectable interaction element(s) may be positioned proximate first object(s) in the first portion(s) 134A. The second selectable interaction element(s) may be positioned proximate second object(s) in the second portion(s), and so on.

In an example embodiment, the 360-degree view that is captured by 360-degree camera 114 includes a plurality of image frames. For instance, the plurality of image frames may correspond to a plurality of respective exposures by the 360-degree camera 114. Accordingly, the 360-degree view may be referred to as a 360-degree image stream, though the scope of the example embodiments is not limited in this respect. In accordance with this embodiment, each image frame includes a plurality of image pixels. In further accordance with this embodiment, the 360-degree video stream 132 includes a plurality of video frames. In further accordance with this embodiment, each video frame includes a plurality of display pixels.

In an aspect of this embodiment, 360-degree camera 114 uses the plurality of image frames to generate the plurality of respective video frames. Accordingly, 360-degree camera 114 may use the image pixels in each image frame to generate the corresponding plurality of display pixels in the respective display frame. For instance, 360-degree camera 114 may generate a first plurality of display pixels in a first video frame of the plurality of video frames using a first plurality of image pixels in a first image frame of the plurality of image frames. 360-degree camera 114 may generate a second plurality of display pixels in a second video frame of the plurality of video frames using a second plurality of image pixels in a second image frame of the plurality of image frames, and so on.

Local interaction logic 118 may receive selection identifier(s) 138 from one or more of remote computing devices 106A-106N. For example, the selection identifier(s) 138 may include any one or more of the selection identifiers 136A-136N from respective remote computing devices 106A-106N. The selection identifiers 136A-136N are received from respective remote computing devices 106A-106N in response to users of the remote computing devices 106A-106N selecting respective selectable interaction elements in the respective portion(s) 134A-134N of the 360-degree video stream 132 that are provided to respective remote computing devices 106A-106N. Accordingly, the selection identifiers 136A-136N identify respective selectable interaction elements that are selected by users of the respective remote computing devices 106A-106N. The selection identifiers 136A-136N are described in further detail below.

Local interaction logic 118 may provide instance(s) of information 140 pertaining to the respective object(s) that are associated with the respective selectable interaction element(s) that are identified by the respective selection identifier(s) 138. For instance, the instance(s) of information 140 may include any one or more of the instances of information 142A-142N. The first instance of information 142A pertains to a first object that is associated with a first selectable interaction element that is identified by the first selection identifier 136A. A second instance of information (not shown) pertains to a second object that is associated with a second selectable interaction element that is identified by a second selection identifier (not shown), and so on. Each of the instances of information 142A-142N may include information about a person (e.g., a local participant of a video conference), an interface (e.g., for generation of a message or for receiving user input that is to be presented on a display in an environment of local computing device 102), a video stream captured by a selected camera (e.g., a camera in the environment other than 360-degree camera 114), content (e.g., raw content) that is configured to be presented on a display in the environment, an image of content that is written on a whiteboard in the environment, etc.

Remote computing devices 106A-106N are processing systems that are capable of communicating with local computing device 102. Remote computing devices 106A-106N include respective remote displays 122A-122N, remote cameras 124A-124N, remote microphones 126A-126N, and remote interaction logic 128A-128N.

Remote displays 122A-122N are configured to display respective portion(s) 134A-134N of the 360-degree video stream 132. Each of the portion(s) 134A-134N may include any one or more portions (e.g., an entirety) of the 360-degree video stream 132. For instance, each of the portion(s) 134A-134N may be same as or different from any one or more others of the portion(s) 134A-134N.

Remote cameras 124A-124N are configured to capture views of respective remote users (e.g., remote participants of a video conference). For example, first remote camera 124A may be configured to capture a first remote user who owns or otherwise has access to first remote computing device 106A. In another example, Nth remote camera 124N may be configured to capture an Nth remote user who owns or otherwise has access to Nth remote computing device 106N. Remote cameras 124A-124N are further configured to generate respective remote video streams 144A-144N.

Remote microphones 126A-126N are configured to receive speech of the respective remote users and other sounds that are audible to a human.

Remote interaction logic 128A-128N are configured to perform one or more of the operations described herein to provide selectable interaction element(s) in respective portion(s) 134A-134N of the 360-degree video stream 132. For example, first remote interaction logic 128A may automatically identify first object(s) in the 360-degree view that is captured by 360-degree camera 114. For instance, first remote interaction logic 128A may receive the 360-degree view from local interaction logic 118. In accordance with this example, first remote interaction logic 128A may associate first selectable interaction element(s) with the respective first object(s). The first selectable interaction element(s) are configured to be incorporated into the first portion(s) 134A. Each of the first selectable interaction element(s) is selectable to provide information pertaining to the first object with which the respective first selectable interaction element is associated. First remote interaction logic 128A may incorporate the first selectable interaction element(s) into the first portion(s) 134A such that the first selectable interaction element(s) are positioned proximate the first object(s) with which the respective first selectable interaction element(s) are associated in the first portion(s) 134A.

In accordance with this example, first remote interaction logic 128A may determine that a designated first selectable interaction element of the first selectable interaction element(s) is selected. In response, first remote interaction logic 128A may provide the first instance of information 142A pertaining to the first object that is associated with the designated first selectable interaction element (e.g., for presentation on first remote display 122A).

In another example, Nth remote interaction logic 128N may automatically identify Nth object(s) in the 360-degree view that is captured by 360-degree camera 114. For instance, Nth remote interaction logic 128N may receive the 360-degree view from local interaction logic 118. In accordance with this example, Nth remote interaction logic 128N may associate Nth selectable interaction element(s) with the respective Nth object(s). The Nth selectable interaction element(s) are configured to be incorporated into the Nth portion(s) 134N. Each of the Nth selectable interaction element(s) is selectable to provide information pertaining to the Nth object with which the respective Nth selectable interaction element is associated. Nth remote interaction logic 128N may incorporate the Nth selectable interaction element(s) into the Nth portion(s) 134N such that the Nth selectable interaction element(s) are positioned proximate the Nth object(s) with which the respective Nth selectable interaction element(s) are associated in the Nth portion(s) 134N.

In accordance with this example, Nth remote interaction logic 128N may determine that a designated Nth selectable interaction element of the Nth selectable interaction element(s) is selected. In response, Nth remote interaction logic 128N may provide the Nth instance of information 142N pertaining to the Nth object that is associated with the designated Nth selectable interaction element (e.g., for presentation on Nth remote display 122N).

Remote computing devices 106A-106N may include any client-enabled system or device, including but not limited to a desktop computer, a laptop computer, a tablet computer, a personal digital assistant, a cellular telephone, a wearable device, or the like.

Example techniques for providing selectable interaction elements in a 360-degree video stream are discussed in greater detail below with reference to FIGS. 2-10.

Local interaction logic 118 and/or any of remote interaction logic 128A-128N may be implemented in various ways to provide selectable interaction elements in a 360-degree video stream, including being implemented in hardware, software, firmware, or any combination thereof. For example, local interaction logic 118 and/or any of remote interaction logic 128A-128N may be implemented as computer program code configured to be executed in one or more processors. In another example, local interaction logic 118 and/or any of remote interaction logic 128A-128N may be implemented as hardware logic/electrical circuitry. For instance, local interaction logic 118 and/or any of remote interaction logic 128A-128N may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
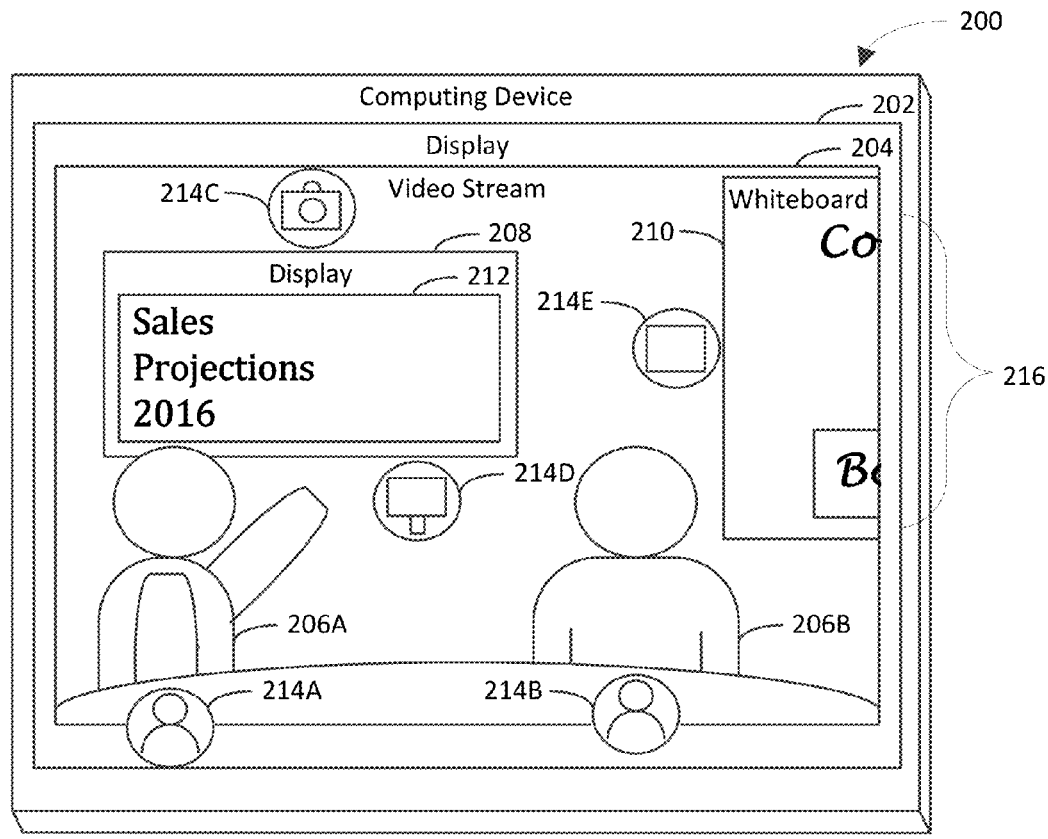
FIGS. 2-4 are block diagrams of example computing devices showing selectable interaction elements in a 360-degree video stream in accordance with embodiments.

FIG. 2 is a block diagram of an example computing device 200 showing selectable interaction elements 214A-214E in a 360-degree video stream 204 in accordance with an embodiment. As shown in FIG. 2, computing device 200 includes a display 202 on which a portion of the 360-degree video stream 204 is shown. Display 202 displays a portion of the 360-degree video stream 204 for illustrative purposes and is not intended to be limiting. It will be recognized that display 202 may display an entirety of the 360-degree video stream 204. Moreover, it can be said that the selectable interaction elements 214A-214E are incorporated into the 360-degree video stream 204 regardless whether the selectable interaction elements 214A-214E are incorporated into a portion of the 360-degree video stream 204 or an entirety of the 360-degree video stream 204.

The 360-degree video stream 204 includes persons 206A and 206B (e.g., local participants of a video conference), a display 208, and a whiteboard 210. Display 208 is shown to display content 212, which reads "Sales Projections 2016." Whiteboard 210 is shown to have content 216 written thereon. Only a portion of the content 216 is shown within the portion of the 360-degree video stream 204 shown on display 202. Selectable interaction elements 214A and 214B are associated with the respective persons 206A and 206B. Accordingly, selectable interaction elements 214A and 214B are positioned proximate the respective persons 206A and 206B in the 360-degree video stream 204. Selectable interaction element 214A is selectable by a user of computing device 200 to provide first information regarding person 206A (e.g., to cause the first information to be presented on display 202). Selectable interaction element 214B is selectable by the user to provide second information regarding person 206B (e.g., to cause the second information to be presented on display 202).

Display 208 is shown to be implemented as an active display in FIG. 2 for illustrative purposes and is not intended to be limiting. Accordingly, display 208 includes a camera, which is referred to herein as a "second camera" to avoid confusion with the 360-degree camera that generates the 360-degree video stream 204. Selectable interaction element 214D is associated with display 208 (e.g., the content 212 that is shown thereon), and selectable interaction element 214C is associated with the second camera. Accordingly, selectable interaction elements 214C and 214D are positioned proximate the second camera and the display 208, respectively, in the 360-degree video stream 204. Selectable interaction element 214C is selectable by the user to provide third information regarding the second camera (e.g., to cause the third information to be presented on display 202). Selectable interaction element 214D is selectable by the user to provide fourth information regarding display 208 (e.g., to cause the fourth information to be presented on display 202).

Selectable interaction element 214E is associated with whiteboard 210 (e.g., the content 216 that is written thereon). Accordingly, selectable interaction element 214E is positioned proximate whiteboard 210 in the 360-degree video stream 204. Selectable interaction element 214E is selectable by the user to provide fifth information regarding whiteboard 210 (e.g., to cause the fifth information to be presented on display 202).

Figure 3:
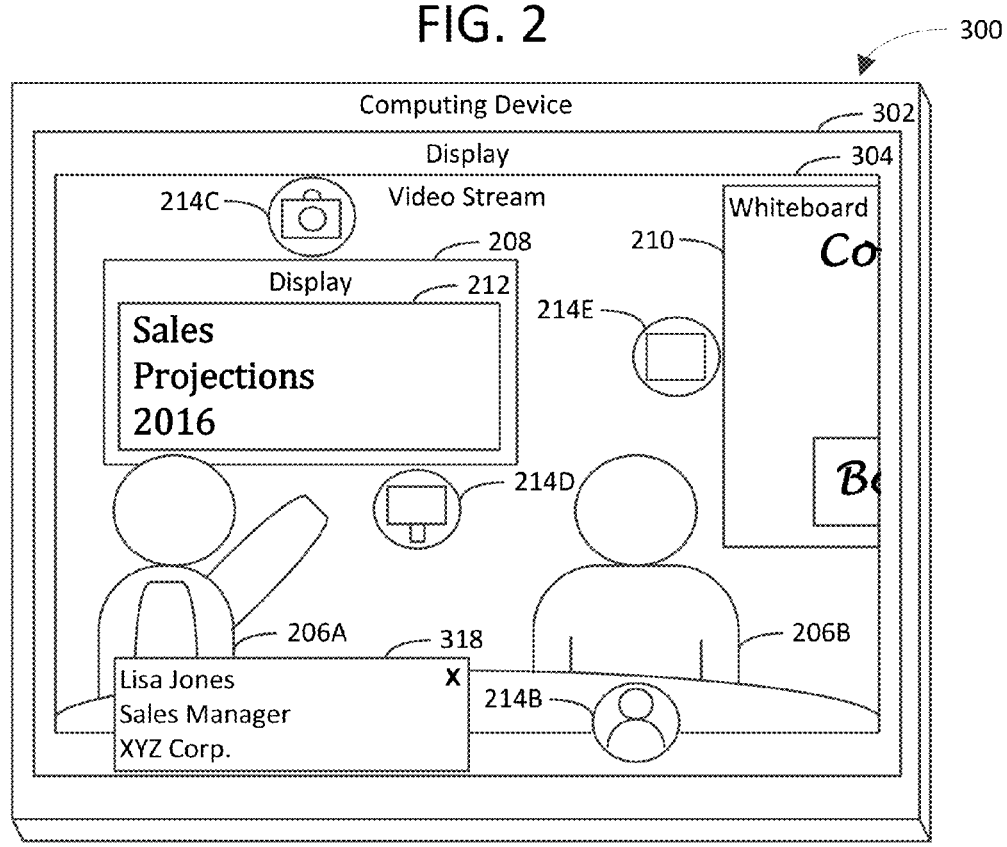

FIG. 3 is a block diagram of another example computing device 300 showing selectable interaction elements 214B-214E in a 360-degree video stream 304 in accordance with an embodiment. As shown in FIG. 3, computing device 300 includes a display 302 on which a portion of the 360-degree video stream 304 is shown. FIG. 3 depicts one example result of selecting selectable interaction element 214A in FIG. 2. For instance, selecting selectable interaction element 214A, which is associated with person 206A, in FIG. 2 may cause information about person 206A (e.g., the first information described above with reference to FIG. 2) to be shown on display 302. In the embodiment of FIG. 3, selecting selectable interaction element 214A in FIG. 2 causes an information window 318, which includes the information about person 206A, to be shown on display 302. Selectable interaction element 214A is occluded by information window 318 in video stream 304 for illustrative purposes. The information in information window 318 specifies the name of person 206A, "Lisa Jones;" a title or role of person 206A, "Sales Manager;" and a company for which person 206A works, "XYZ Corp."

The information in information window 318 is provided for illustrative purposes and is not intended to be limiting. It will be recognized that information window 318 may include any suitable information pertaining to person 206A. Information window 318 includes an interactive element labeled as an "X" that is selectable to cause information window 318 to be closed (e.g., to be removed from display 302).

Figure 4:
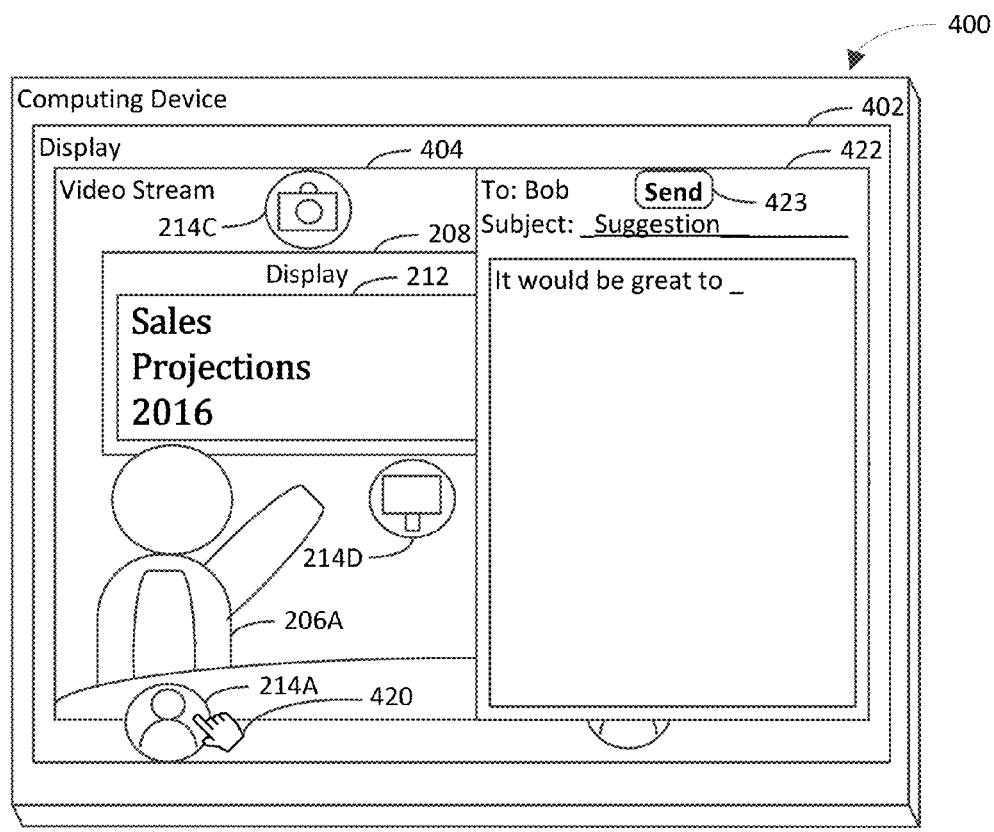

FIG. 4 is a block diagram of another example computing device 400 showing selectable interaction elements 214A, 214C, and 214D in a 360-degree video stream 404 in accordance with an embodiment. As shown in FIG. 4, computing device 400 includes a display 402 on which a portion of the 360-degree video stream 404 is shown. FIG. 4 depicts another example result of selecting selectable interaction element 214A in FIG. 2. A cursor 420 is placed proximate selecting selectable interaction element 214A in FIG. 4 to indicate that selectable interaction element 214A is selected. As shown in FIG. 4, selecting selectable interaction element 214A in FIG. 2 may cause an interface 422 to be shown on display 402. For instance, the first information described above with reference to FIG. 2 may include the interface 422. Interface 422 is configured to enable a user of computing device 400 to generate a message (e.g., a textual message) for delivery to person 206A. Examples of a message include but are not limited to a social update, an email, a short message service (SMS) message, an instant message (IM), an online chat message, etc.

In the embodiment of FIG. 4, the name of person 206A is "Bob." Interface 422 shows selection of selectable interface element 214A has initiated a message to be sent to Bob. The user has listed the subject of the message to be "Suggestion." The user has begun typing the body of the message, which begins, "It would be great to . . . ." Interface 422 is shown to consume approximately one-half of display 402, and consequently occlude approximately one-half of the 360-degree video stream 404, for illustrative purposes and is not intended to be limiting. It will be recognized that interface 422 may consume any suitable portion of display 402, and interface 422 need not necessarily occlude any portion of the 360-degree video stream 404. For instance, the portion of the 360-degree video stream 204 that is shown in FIG. 2 may be provided in its entirety in a first area of display 402, and interface 422 may be provided in a second area of display 402, in response to selectable interface element 214A being selected. For instance, the portion of the 360-degree video stream may be resized to fit in the first area of display 402.

Interface 422 includes a virtual "Send" button 423 that is selectable to cause the message to be delivered to person 206A. Selecting the virtual "Send" button may also cause interface 422 to be closed (e.g., to be removed from display 402).

Figure 5:
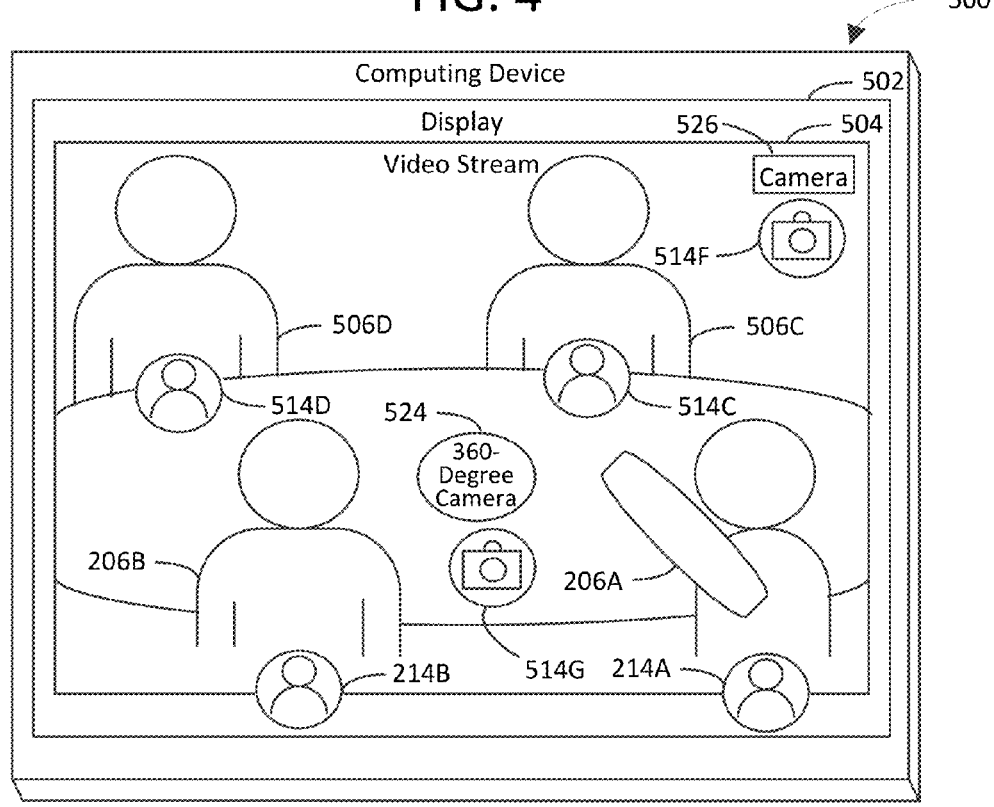
FIG. 5 is a block diagram of an example computing device showing a video stream in accordance with an embodiment.

FIG. 5 is a block diagram of an example computing device 500 showing a video stream 504 in accordance with an embodiment. As shown in FIG. 5, computing device 500 includes a display 502 on which the video stream 504 is shown. FIG. 5 depicts an example result of selecting selectable interaction element 214C in FIG. 2. As shown in FIG. 5, selecting selectable interaction element 214C, which is associated with the second camera that is included in display 208, in FIG. 2 causes the video stream 504 to be shown on display 502. For instance, the third information described above with reference to FIG. 2 may include the video stream 504. The video stream 504 is captured by the second camera. Thus, the video stream 504 provides a perspective of the environment in which the 360-degree camera 524, which generates the 360-degree video streams 202, 302, and 404 of respective FIGS. 2-4, is located that is different from the perspective of the 360-degree camera 524.

For instance, the video stream 504 includes persons 206A and 206B, which were also included in the 360-degree video stream 202, though from the perspective of the second camera, which is included in display 208. The video stream 504 further includes persons 506C and 506D, a third camera 526, and the 360-degree camera 524.

Selectable interaction elements 214A and 214B are associated with the respective persons 206A and 206B. Accordingly, selectable interaction elements 214A and 214B are positioned proximate the respective persons 206A and 206B in the video stream 504. Selectable interaction element 214A is selectable by a user of computing device 500 to provide the first information regarding person 206A. Selectable interaction element 214B is selectable by the user to provide the second information regarding person 206B.

Selectable interaction elements 514C and 514D are associated with the respective persons 506C and 506D. Accordingly, selectable interaction elements 514C and 514D are positioned proximate the respective persons 506C and 506D in the video stream 504. Selectable interaction element 514C is selectable by a user of computing device 500 to provide sixth information regarding person 506C. Selectable interaction element 514D is selectable by the user to provide seventh information regarding person 506D.

Selectable interaction element 514F is associated with the third camera 526, and selectable interaction element 514G is associated with the 360-degree camera 524. Accordingly, selectable interaction elements 514F and 514G are positioned proximate the third camera 526 and the 360-degree camera 524, respectively, in the 360-degree video stream 504. Selectable interaction element 514F is selectable by the user to provide eighth information regarding the third camera 526 (e.g., a video stream that is generated by the third camera 526). Selectable interaction element 514G is selectable by the user to provide ninth information regarding the 360-degree camera 524 (e.g., any of video streams 202, 302, and 402 generated by the 360-degree camera 524).

Figure 6:
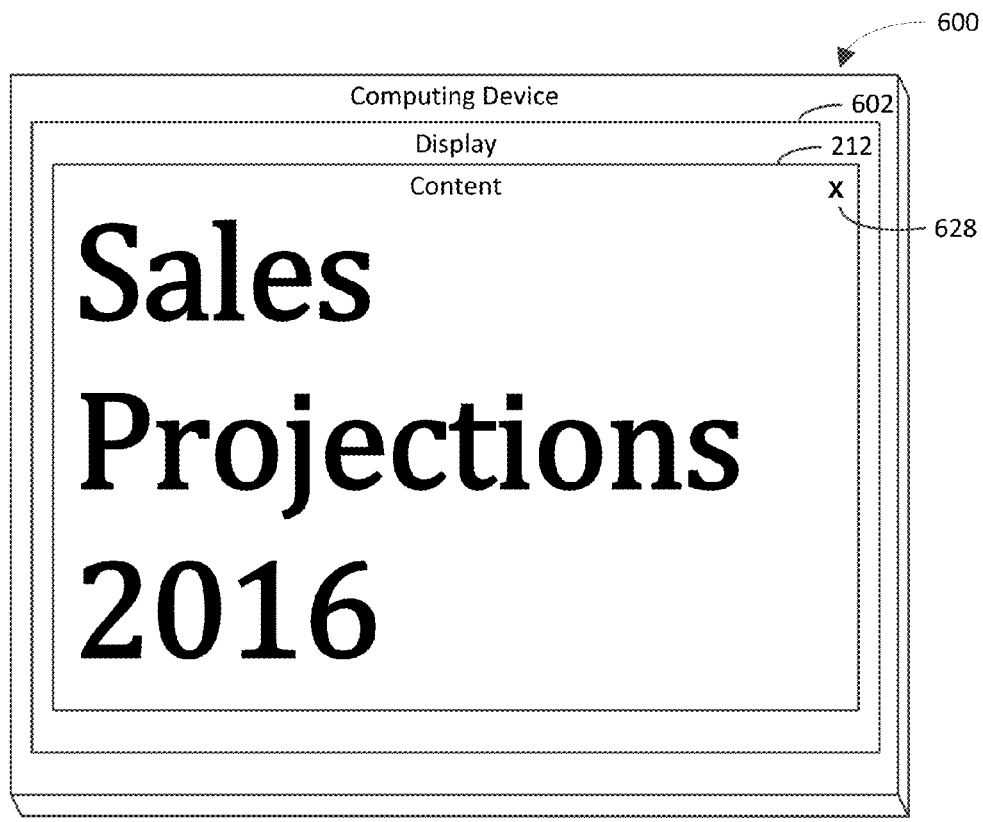
FIG. 6 is a block diagram of an example computing device showing content in accordance with an embodiment.

FIG. 6 is a block diagram of an example computing device 600 showing content 212 in accordance with an embodiment. As shown in FIG. 6, computing device 600 includes a display 602 on which the content 212 is shown. FIG. 6 depicts an example result of selecting selectable interaction element 214D in FIG. 2. For instance, selecting selectable interaction element 214D, which is associated with display 208, in FIG. 2 may cause information pertaining to display 208 (e.g., the fourth information described above with reference to FIG. 2) to be shown on display 602. In the embodiment of FIG. 6, the information pertaining to display 208 is the content 212, which is displayed on display 208. Accordingly, in the embodiment of FIG. 6, selecting selectable interaction element 214D in FIG. 2 causes the content 212 to be shown on display 602. The content 212, as shown on display 602, may be updated in real-time as the content 212 changes on display 208. Accordingly, the user of computing device 600 may be shown a view (e.g., a full-screen view) of the same content 212 that is shown to persons (e.g., persons 206A, 206B, 506C, and 506D) on display 208 in the environment in which 360-degree camera 524 is located.

An interactive element 628 labeled as an "X" is overlaid on the content 212 for illustrative purposes and is not intended to be limiting. It will be recognized that the interactive element 628 need not necessarily be overlaid on the content 212. The interaction element 628 is selectable to cause the view of the content 212 to be closed (e.g., to be removed from display 602). For instance, selection of the interaction element 628 may cause the view of the content 212 to be replaced with the video stream 204 shown in FIG. 2.

Additionally or alternatively, selecting selectable interaction element 214D in FIG. 2 may cause content that is shown on display 602 (e.g., content that is written on display 602) to be shown on display 208. The content shown on display 208 may be updated in real-time as the content shown on display 602 is changed. For example, display 602 may be a touch-enabled and/or hover-enabled display. A touch-enabled display is a display that is configured to detect contact of objects with the touch-enabled display. A hover-enabled display is a display that is configured to detect objects within a spaced distance from the hover-enabled display. In accordance with this example, as a user of computing device 600 writes on display 602 (e.g., using a finger or a stylus), the writing may appear on display 208 in real-time as the user writes. Accordingly, viewers of the display 208 (e.g., any of persons 206A, 206B, 506C, and/or 506D) may be shown the content that is shown on display 602 (e.g., in real-time as the content is being generated on display 602).

Figure 7:
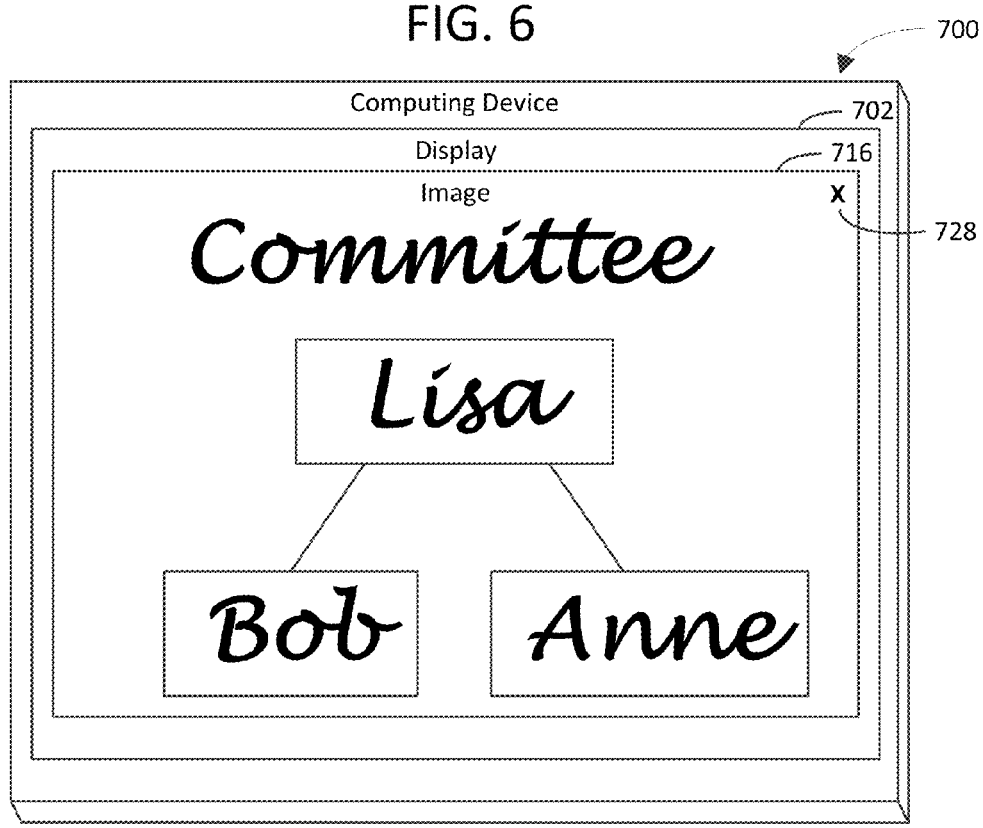
FIG. 7 is a block diagram of an example computing device showing an image in accordance with an embodiment.

FIG. 7 is a block diagram of an example computing device 700 showing an image 712 in accordance with an embodiment. As shown in FIG. 6, computing device 700 includes a display 702 on which the image 716 is shown. FIG. 7 depicts an example result of selecting selectable interaction element 214E in FIG. 2. For instance, selecting selectable interaction element 214E, which is associated with whiteboard 210, in FIG. 2 may cause information pertaining to whiteboard 210 (e.g., the fifth information described above with reference to FIG. 2) to be shown on display 702. In the embodiment of FIG. 7, the information pertaining to whiteboard 210 is the image 716 of the content 216, which is written on whiteboard 210. Accordingly, in the embodiment of FIG. 7, selecting selectable interaction element 214E in FIG. 2 causes the image 716 of the content 216 to be shown on display 702.

The image 716 may be a full-screen image (e.g., consuming substantially all of display 702), though the scope of the example embodiments is not limited in this respect. The image 716 may be captured by any suitable camera, such as 360-degree camera 524 or third camera 526, both of which are described above with reference to FIG. 5. The image 716 of the content 216 may be a still image (e.g., a snapshot) of the content 216, as written on whiteboard 210, at a designated instance of time (e.g., an instance of time at which the image 716 is captured). Accordingly, the image 716, as shown on display 702, may not be updated in real-time as the content 216 is changed on whiteboard 210. Rather, the image 716 may be replaced by an updated image of the content 216 in response to a manual user command, which may cause the updated image to be captured.

An interactive element 728 labeled as an "X" is overlaid on the image 716 for illustrative purposes and is not intended to be limiting. The interaction element 728 is selectable to cause the image 716 to be closed (e.g., to be removed from display 702). For instance, selection of the interaction element 728 may cause the image 716 to be replaced with the video stream 204 shown in FIG. 2.

Figure 8:
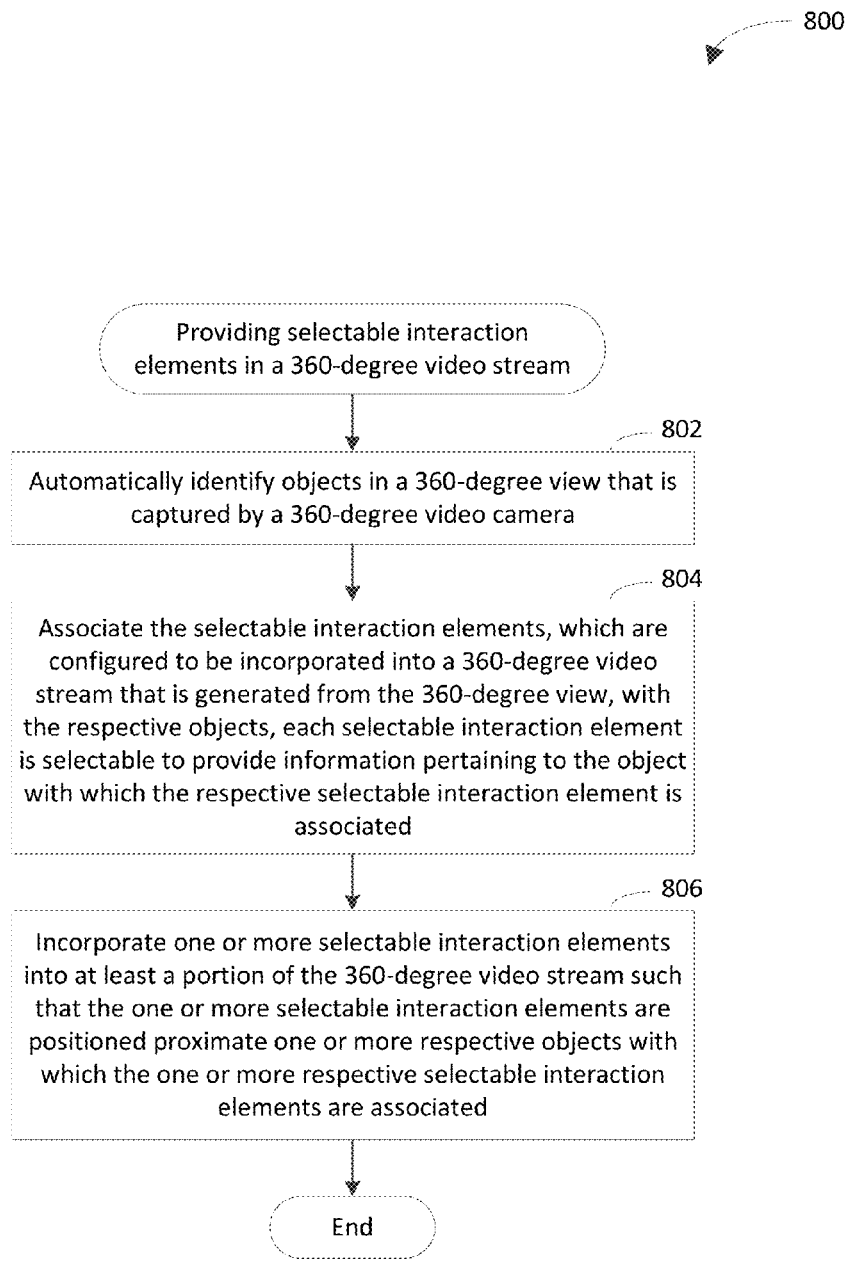
FIGS. 8-9 depict flowcharts of example methods for providing selectable interaction elements in a 360-degree video stream in accordance with embodiments.
Figure 9:
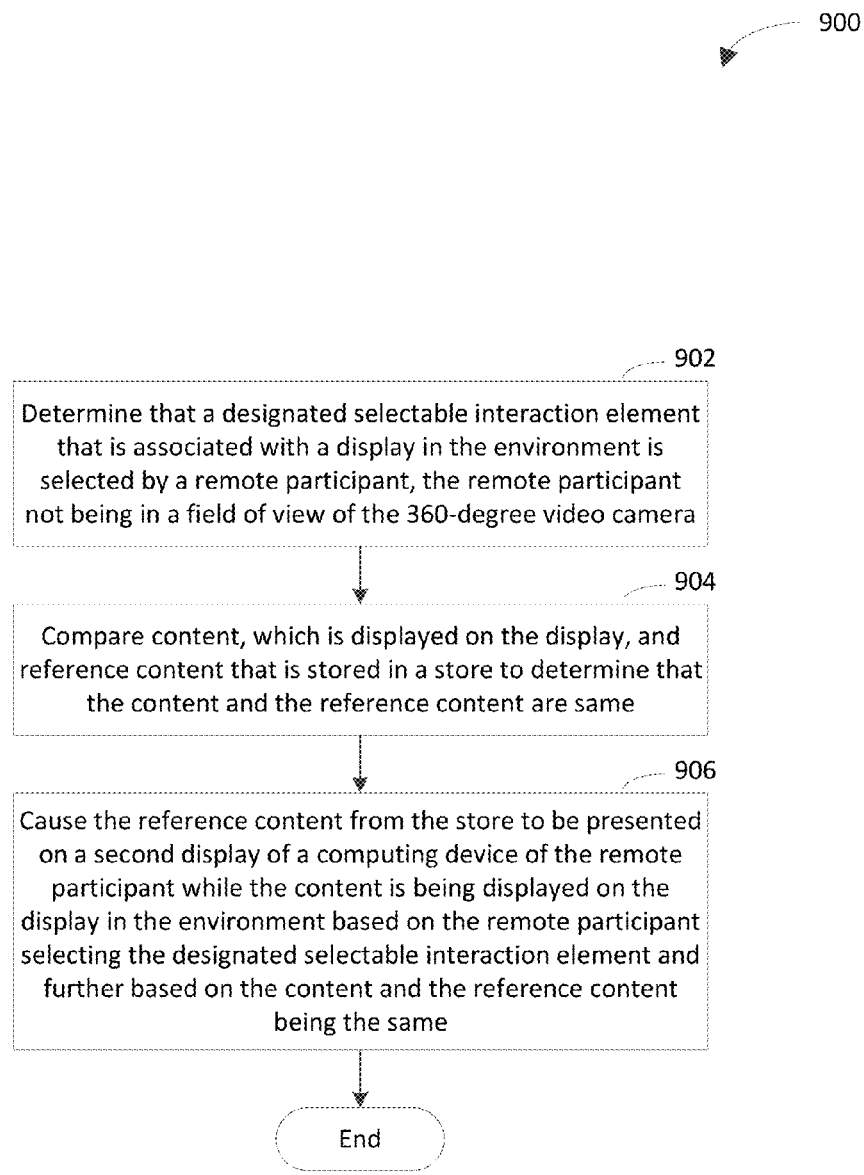
Figure 10:
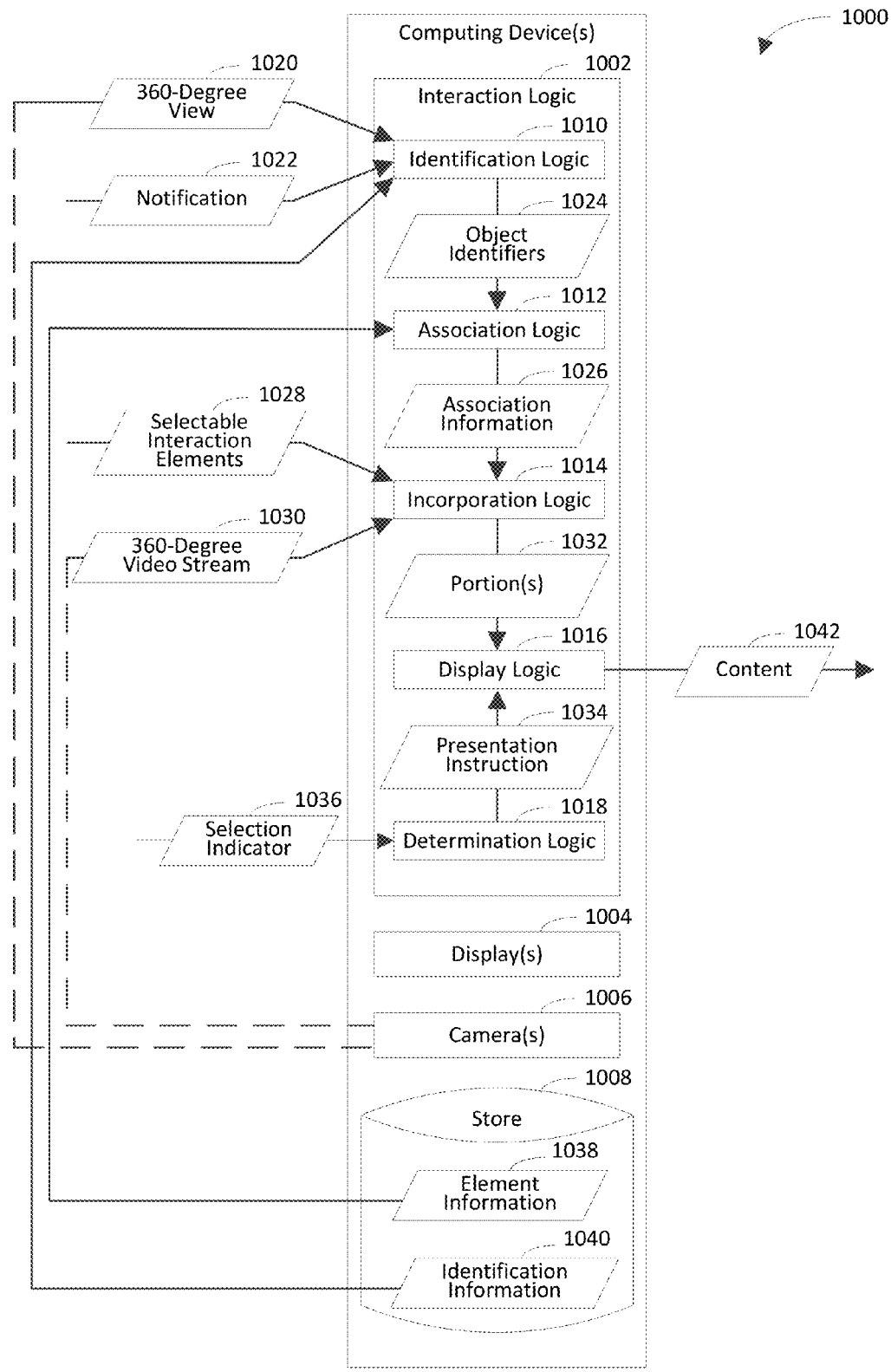
FIG. 10 is a block diagram of an example computing system in accordance with an embodiment.

FIGS. 8-9 depict flowcharts 800 and 900 of example methods for providing selectable interaction elements in a 360-degree video stream in accordance with embodiments. Flowcharts 800 and 900 may be performed by local computing device 102 and/or any one or more of remote computing devices 106A-106N shown in FIG. 1, for example. For illustrative purposes, flowcharts 800 and 900 are described with respect to computing device(s) 1000 shown in FIG. 10. For instance, computing device(s) 1000 may be an example implementation of local computing device 102 and/or any one or more of remote computing devices 106A-106N shown in FIG. 1. As shown in FIG. 10, computing device(s) 1000 include interaction logic 1002, display(s) 1004, camera(s) 1006, and store 1008. Interaction logic 1002 includes identification logic 1010, association logic 1012, incorporation logic 1014, display logic 1016, and determination logic 1018. Further structural and operational embodiments will be apparent to persons skilled in the relevant art(s) based on the discussion regarding flowcharts 800 and 900.

As shown in FIG. 8, the method of flowchart 800 begins at step 802. In step 802, objects in a 360-degree view that is captured by a 360-degree video camera are automatically identified. In an example implementation, identification logic 1010 automatically identifies the objects in a 360-degree view 1020 that is captured by the 360-degree video camera. The 360-degree video camera may be included in camera(s) 1006, though the scope of the example embodiments is not limited in this respect. In accordance with this implementation, identification logic 1010 may generate object identifiers 1024 to identify the respective objects.

In an example embodiment, automatically identifying the objects at step 802 includes receiving a notification from an electronic device in the 360-degree view. The notification indicates presence of the electronic device. For example, identification logic 1010 may receive a notification 1022 from the electronic device in the 360-degree view 1020. In accordance with this example, the notification 1022 indicates the presence of the electronic device. The notification may further indicate a location of the electronic device, though the scope of the example embodiments is not limited in this respect. In an aspect of this embodiment, the notification is an infrared signal that identifies the electronic device. In accordance with this aspect, the notification may uniquely identify the electronic device (e.g., based on a frequency and/or a magnitude of the infrared signal). In accordance with this embodiment, automatically identifying the objects at step 802 further includes automatically identifying the electronic device in the 360-degree view based on receipt of the notification. For instance, identification logic 1010 may automatically identify the electronic device in the 360-degree view 1020 based on receipt of the notification 1022.

In another example embodiment, automatically identifying the objects at step 802 includes receiving (e.g., retrieving) instances of identification information that identify first respective persons from a store. For example, store 1008 may store instances of identification information 1040. In accordance with this example, identification logic 1010 may receive the instance of the identification information 1040 from store 1008. In accordance with this embodiment, automatically identifying the objects at step 802 further includes comparing images of second persons who are in the 360-degree view and the instances of the identification information. The images are captured by the 360-degree video camera. The first persons include the second persons. For example, identification logic 1010 may compare the images of the second persons who are in the 360-degree view 1020 and the instances of the identification information 1040. The images may be captured by a 360-degree video camera that is included in the camera(s) 1006. In further accordance with this embodiment, the comparing includes matching each of the second persons to a respective instance of the identification information to identify the respective second person. For instance, identification logic 1010 may match each of the second persons to a respective instance of the identification information 1040 to identify the respective second person.

It should be noted that store 1008 may be any suitable type of store. One type of store is a database. For instance, store 1008 may be a relational database, an entity-relationship database, an object database, an object relational database, an extensible markup language (XML) database, etc.

At step 804, the selectable interaction elements, which are configured to be incorporated into a 360-degree video stream that is generated from the 360-degree view, are associated with the respective objects. For instance, the selectable interaction elements may be programmatically associated with the respective objects. Examples of a selectable interaction element include but are not limited to text, an icon, and a widget. Each selectable interaction element is selectable to provide information pertaining to (e.g., describing) the object with which the respective selectable interaction element is associated. For instance, each selectable interaction element may be configured to cause the information pertaining to the object with which the respective selectable interaction element is associated to be provided in response to selection of the respective selectable interaction element.

In an example implementation, association logic 1012 associates selectable interaction elements 1028 with the respective objects. For example, store 1040 may store element information 1038. Element information 1038 may include instance of information that indicate the respective selectable interaction elements 1028. In accordance with this example, association logic 1012 may cross-reference the object identifiers 1024 and the element information 1038 to associate the selectable interaction elements 1028 with the respective objects. For instance, association logic 1012 may compare each of the object identifiers 1024 with the element information 1038 to match the respective identifier with the instance of information that indicates the selectable interaction element that is to be associated with the respective identifier. For example, association logic 1012 may determine that a designated selectable interactive element is to be associated with a designated identifier based on a type and/or configuration of the designated selectable interactive element. In accordance with this implementation, association logic 1012 may generate association information 1026 in response to associating the selectable interaction elements 1028 with the respective objects. For instance, the association information 1026 may indicate that the selectable interaction elements 1028 are associated with the respective objects.

It will be recognized that camera(s) 1006 need not necessarily capture the 360-degree camera view 1020 and/or generate the 360-degree video stream 1030, as depicted by the dashed lines leading from camera(s) 1006 in FIG. 10.

At step 806, one or more selectable interaction elements are incorporated into at least a portion of the 360-degree video stream such that the one or more selectable interaction elements are positioned proximate one or more respective objects with which the one or more respective selectable interaction elements are associated. In an example implementation, incorporation logic 1014 incorporates the one or more selectable interaction elements into at least a portion of a 360-degree video stream 1030 such that the one or more selectable interaction elements are positioned proximate one or more respective objects with which the one or more respective selectable interaction elements are associated. For instance, incorporation logic 1014 may incorporate the one or more selectable interaction elements into at least the portion of the 360-degree video stream 1030 based on the association information 1026. Display logic 1016 may cause at least the portion of the 360-degree video stream 1030 to be displayed on any one or more of display(s) 1004, though the example embodiments are not limited in this respect.

In an example embodiment, incorporating the one or more selectable interaction elements into at least the portion of the 360-degree video stream includes transforming (e.g., converting) the 360-degree video stream from a non-interactive video stream to an interactive video stream. A non-interactive video stream is a video stream for which a user is unable to interact with elements shown in the video stream (e.g., a user is unable to select an element in the video stream to cause an operation to be performed) or a video stream that does not include elements with which a user is able to interact. An interactive video stream is a video stream that is not a non-interactive video stream. In accordance with this embodiment, transforming the 360-degree video stream may include transforming the 360-degree video stream from a first state in which the 360-degree video stream is non-interactive to a second state in which the 360-degree video stream is interactive.

In some example embodiments, one or more steps 802, 804, and/or 806 of flowchart 800 may not be performed. Moreover, steps in addition to or in lieu of steps 802, 804, and/or 806 may be performed. For instance, in an example embodiment, automatically identifying the objects at step 802 includes automatically identifying local participants of a video conference in the 360-degree view. Each local participant is within a field of view of the 360-degree video camera. In accordance with this embodiment, associating the selectable interaction elements with the respective objects at step 804 includes associating designated selectable interaction elements with the local participants. Each designated selectable interaction element is selectable to provide information about the local participant with which the respective designated selectable interaction element is associated. For instance, the information may indicate a role of the local participant with regard to a project, a position of the local participant within an organization, and/or a name of the local participant. In further accordance with this embodiment, incorporating the one or more selectable interaction elements into at least the portion of the 360-degree video stream at step 806 includes positioning one or more designated selectable interaction elements proximate one or more local participants with whom the one or more respective designated selectable interaction elements are associated (e.g., for presentation on a display of a computing device of a remote participant of the video conference who is not within the field of view of the 360-degree video camera).

In an aspect of this embodiment, the method of flowchart 800 further includes determining that a first designated selectable interaction element that is associated with a first local participant is selected by a remote participant. The remote participant is not in a field of view of the 360-degree video camera. For instance, the first designated selectable interaction element may be selected by a click, double-click, mouse over, gesture (e.g., blink, gaze, nod, point), voice command, etc. Determining that the first designated selectable interaction element is selected by the remote participant may include determining that the first designated selectable interaction element is selected via a computing device of the remote participant (e.g., via a computing device that is owned by or otherwise associated with the remote participant). For example, an Internet Protocol (IP) address that is assigned to the computing device of the remote participant may be used to determine that the first designated selectable interaction element is selected via the computing device of the remote participant. In accordance with this example, matching an IP address of the computing device via which the first designated selectable interaction element is selected to a reference IP address that is assigned to the computing device of the remote participant may indicate that the computing device via which the first designated selectable interaction element is selected is the computing device of the remote participant.

For example, determination logic 1018 may determine that the first designated selectable interaction element is selected by the remote participant. In accordance with this example, selection indicator 1036 may indicate that the first designated selectable interaction element is selected by the remote participant. In further accordance with this example, determination logic 1018 may determine that the first designated selectable interaction element is selected by the remote participant based on the selection indicator 1036. Determination logic 1018 may generate a presentation instruction 1034 in response to the determination. The presentation instruction 1034 may instruct display logic 1016 to cause the information about the first local participant to be presented on the display (e.g., any of display(s) 1004) of the computing device of the remote participant.

In accordance with this aspect, the method of flowchart 800 further includes causing the information about the first local participant to be presented on a display of a computing device of the remote participant based on the remote participant selecting the first designated selectable interaction element. For example, display logic 1016 may cause the information about the first local participant to be presented on the display of the computing device of the remote participant. In accordance with this example, display logic 1016 may provide content 1042 to the computing device of the remote participant or to the display thereof. The content 1042 may include the information about the first local participant. Display logic 1016 may provide the information to the computing device of the remote participant or to the display thereof based on the presentation instruction 1034.

In another example embodiment, automatically identifying the objects at step 802 includes automatically identifying local participants of a video conference in the 360-degree view. Each local participant is within a field of view of the 360-degree video camera. In accordance with this embodiment, associating the selectable interaction elements with the respective objects at step 804 includes associating designated selectable interaction elements with the local participants. Each designated selectable interaction element is selectable by a remote participant of the video conference to provide an interface configured to enable the remote participant to generate a message for delivery to the local participant with which the respective designated selectable interaction element is associated. Examples of a message include but are not limited to a social update, an email, a short message service (SMS) message, an instant message (IM), an online chat message, etc. The remote participant is not in the field of view of the 360-degree video camera. In further accordance with this embodiment, incorporating the one or more selectable interaction elements into at least the portion of the 360-degree video stream at step 806 includes positioning one or more designated selectable interaction elements proximate one or more local participants with whom the one or more respective designated selectable interaction elements are associated (e.g., for presentation on the display of the computing device of the remote participant).

In an aspect of this embodiment, the method of flowchart 800 further includes determining that a first designated selectable interaction element that is associated with a first local participant is selected by the remote participant. For example, determination logic 1018 may determine that the first designated selectable interaction element is selected by the remote participant. Determination logic 1018 may generate the presentation instruction 1034 in response to the determination. The presentation instruction 1034 may instruct display logic 1016 to cause the interface to be provided on the display of the computing device of the remote participant.

In accordance with this aspect, the method of flowchart 800 further includes causing the interface to be provided on a display of a computing device of the remote participant based on the remote participant selecting the first designated selectable interface element. The interface enables the remote participant to generate the message for delivery to the first local participant. For example, display logic 1016 may cause the interface to be provided on the display of the computing device of the remote participant. In accordance with this example, display logic 1016 may provide content 1042 to the computing device of the remote participant or to the display thereof. The content 1042 may include the interface. Display logic 1016 may provide the interface to the computing device of the remote participant or to the display thereof based on the presentation instruction 1034.

In an example of this aspect, the method of flowchart 800 further includes causing the message to be delivered to a local computing device of the first local participant via a network for presentation on a display (e.g., any of display(s) 1004) of the local computing device in response to the message being generated. For instance, display logic 1016 may cause the message to be delivered to the local computing device of the first local participant via network 1004.

In yet another example embodiment, the 360-degree view shows an environment within a field of view of the 360-degree video camera that includes local participants of a video conference. For instance, the environment may be a room (e.g., a conference room). In accordance with this embodiment, automatically identifying the objects at step 802 includes automatically identifying a second camera in the environment. In further accordance with this embodiment, associating the selectable interaction elements with the respective objects at step 804 includes associating a designated selectable interaction element with the second camera. The designated selectable interaction element is selectable to provide a video stream that is captured by the second camera. For instance, the video stream may include at least one of the local participants. In further accordance with this embodiment, incorporating the one or more selectable interaction elements into at least the portion of the 360-degree video stream at step 806 includes positioning the designated selectable interaction element proximate the second camera.

In one aspect of this embodiment, a specified selectable interaction element that is associated with the 360-degree video camera is incorporated into the video stream that is captured by the second camera. For instance, incorporation logic 1014 may incorporate the specified selectable interaction element into the video stream that is captured by the second camera. In accordance with this aspect, the specified selectable interaction element is positioned proximate the 360-degree video camera in the video stream that is captured by the second camera. For instance, incorporation logic 1014 may position the specified selectable interaction element proximate the 360-degree video camera in the video stream that is captured by the second camera. In further accordance with this aspect, the specified selectable interaction element is selectable to provide the 360-degree video stream or a portion thereof.

For example, the specified selectable interaction element may be selectable to cause a first camera view to be replaced by a second camera view on a display of a computing device of a remote participant by transitioning from the first camera view to the second camera view in a manner that provides context to indicate a location of the 360-degree video camera with reference to the second camera. In accordance with this example, the first camera view does not include the 360-degree video stream. In further accordance with this example, the second camera view includes the 360-degree video stream. The remote participant is not in a field of view of the 360-degree video camera.

In another aspect of this embodiment, the method of flowchart 800 further includes determining that the designated selectable interaction element is selected by a remote participant. The remote participant is not in a field of view of the 360-degree video camera. For example, determination logic 1018 may determine that the designated selectable interaction element is selected by the remote participant. Determination logic 1018 may generate the presentation instruction 1034 in response to the determination. The presentation instruction 1034 may instruct display logic 1016 to cause the video stream that is captured by the second camera to be presented on a display of a computing device of the remote participant.

In accordance with this aspect, the method of flowchart 800 further includes causing the video stream that is captured by the second camera to be presented on the display of the computing device of the remote participant based on the remote participant selecting the designated selectable interaction element. For example, display logic 1016 may cause the video stream that is captured by the second camera to be presented on the display of the computing device of the remote participant. In accordance with this example, display logic 1016 may provide content 1042 to the computing device of the remote participant or to the display thereof. The content 1042 may include the video stream that is captured by the second camera. Display logic 1016 may provide the video stream that is captured by the second camera to the computing device of the remote participant or to the display thereof based on the presentation instruction 1034.

For example, causing the video stream that is captured by the second camera to be presented may include causing a first camera view to be replaced by a second camera view on the display of the computing device of the remote participant. In accordance with this example, the first camera view does not include the video stream that is captured by the second camera. In further accordance with this example, the second camera view includes the video stream that is captured by the second camera. For instance, causing the first camera view to be replaced by the second camera view may include causing a transition from the first camera view to the second camera view in a manner that provides context to indicate a location of the second camera in the environment.

In still another example embodiment, the 360-degree view shows an environment within a field of view of the 360-degree video camera that includes local participants of a video conference. In accordance with this embodiment, automatically identifying the objects at step 802 includes automatically identifying a whiteboard in the environment. In further accordance with this embodiment, associating the selectable interaction elements with the respective objects at step 804 includes associating a designated selectable interaction element with the whiteboard. The designated selectable interaction element is selectable to provide an image of content that is written on the whiteboard. In further accordance with this embodiment, incorporating the one or more selectable interaction elements into at least the portion of the 360-degree video stream at step 806 includes positioning the designated selectable interaction element proximate the whiteboard.

In an aspect of this embodiment, the method of flowchart 800 further includes determining that the designated selectable interaction element is selected by the remote participant. The remote participant is not in a field of view of the 360-degree video camera. For example, determination logic 1018 may determine that the designated selectable interaction element is selected by the remote participant. Determination logic 1018 may generate the presentation instruction 1034 in response to the determination. The presentation instruction 1034 may instruct display logic 1016 to providing the image of the content for presentation on a display of a computing device of the remote participant.

In accordance with this aspect, the method of flowchart 800 further includes providing the image of the content for presentation on the display of the computing device of the remote participant based on the remote participant selecting the designated selectable interaction element. For example, display logic 1016 may provide the image of the content for presentation on the display of the computing device of the remote participant. In accordance with this example, display logic 1016 may provide content 1042 to the computing device of the remote participant or to the display thereof. The content 1042 may include the image of the content. Display logic 1016 may provide the image of the content to the computing device of the remote participant or to the display thereof based on the presentation instruction 1034.

In an example of this aspect, the method of flowchart 800 further includes capturing the image of the content that is written on the whiteboard. For instance camera(s) 1006 may capture the image of the content that is written on the whiteboard. In accordance with this example, the method of flowchart 800 further includes storing the image of the content that is captured in a store. For instance, camera(s) 1006 may store the image of the content in store 1008. In further accordance with this example, the method of flowchart 800 further includes retrieving the image of the content from the store. For instance, display logic 1016 may retrieve the image of the content from store 1008. In further accordance with this example, providing the image of the content may include providing the image of the content that is retrieved from the store based on the remote participant selecting the designated selectable interaction element.

In yet another example embodiment, the 360-degree view shows an environment within a field of view of the 360-degree video camera that includes local participants of a video conference. In accordance with this embodiment, automatically identifying the objects at step 802 includes automatically identifying a display in the environment. In further accordance with this embodiment, associating the selectable interaction elements with the respective objects at step 804 includes associating a designated selectable interaction element with the display. The designated selectable interaction element is selectable by a remote participant of the video conference to provide an interface configured to enable the remote participant to provide input for presentation on the display. The remote participant is not in the field of view of the 360-degree video camera. In further accordance with this embodiment, incorporating the one or more selectable interaction elements into at least the portion of the 360-degree video stream at step 806 includes positioning the designated selectable interaction element proximate the display.

In an aspect of this embodiment, the method of flowchart 800 further includes determining that the designated selectable interaction element is selected by the remote participant. The remote participant is not in a field of view of the 360-degree video camera. For example, determination logic 1018 may determine that the designated selectable interaction element is selected by the remote participant. Determination logic 1018 may generate the presentation instruction 1034 in response to the determination. The presentation instruction 1034 may instruct display logic 1016 to cause the interface to be provided on a second display of a computing device of the remote participant.

In accordance with this aspect, the method of flowchart 800 further includes causing the interface to be provided on the second display of the computing device of the remote participant based on the remote participant selecting the designated selectable interaction element. For example, display logic 1016 may cause the interface to be provided on the second display of the computing device of the remote participant. In accordance with this example, display logic 1016 may provide content 1042 to the computing device of the remote participant or to the display thereof. The content 1042 may include the interface. Display logic 1016 may provide the interface to the computing device of the remote participant or to the display thereof based on the presentation instruction 1034.

In an example of this aspect, the method of flowchart 800 further includes determining that the input is provided via the interface. For instance, determination logic 1018 may determine that the input is provided via the interface. In accordance with this example, the method of flowchart 800 further includes causing the input to be shown on the display in response to determining that the input is provided via the interface. For instance, causing the input to be shown on the display may include causing the input to be shown on the display in real-time (e.g., as the input is being provided via the interface). For example, display logic 1016 may cause the input to be shown on the display in real-time.

In an example implementation of this embodiment, the designated selectable interaction element is selectable to provide content that is configured to be presented via the display in addition to or in lieu of being selectable to provide an interface configured to enable the remote participant to provide input for presentation on the display. In an aspect of this implementation, the content in addition to or in lieu of the interface is caused to be presented on the second display based on the remote participant selecting the designated selectable interaction element. For instance, causing the content to be presented on the second display may include causing the content to be presented on the second display while the content is being displayed on the display in the environment. In another aspect of this implementation, the method of flowchart 800 may further include enabling the remote participant to control presentation of the content on the second display. For example, display logic 1016 may provide controls for enabling the remote participant to control the presentation of the content on the second display. In accordance with this example, the controls may enable the remote participant to pause, stop, fast forward, rewind, adjust a play speed, etc. of the content on the second display.

In another aspect of this implementation, the method of flowchart 800 further includes one or more of the steps shown in flowchart 900 of FIG. 9.

As shown in FIG. 9, the method of flowchart 900 begins at step 902. In step 902, a determination is made that a designated selectable interaction element that is associated with a display in the environment is selected by a remote participant. The remote participant is not in a field of view of the 360-degree video camera. For instance, determining that the designated selectable interaction element is selected by the remote participant at step 902 may include determining that the designated selectable interaction element is selected by the remote participant while the content is being displayed on the display. In an example implementation, determination logic 1018 determines that the designated selectable interaction element is selected by the remote participant.

At step 904, content, which is displayed on the display, and reference content that is stored in a store are compared to determine that the content and the reference content are same. In an example implementation, determination logic 1018 compares the content and the reference content that is stored in store 1008 to determine that the content and the reference content are the same.

At step 906, the reference content from the store is caused to be presented on a second display of a computing device of the remote participant while the content is being displayed on the display in the environment based on the remote participant selecting the designated selectable interaction element and further based on the content and the reference content being the same. In an example implementation, display logic 1016 causes the reference content from store 1008 to be presented on the second display while the content is being displayed on the display in the environment.

It will be recognized that computing device(s) 1000 may not include one or more of interaction logic 1002, display(s) 1004, camera(s) 1006, store 1008, identification logic 1010, association logic 1012, incorporation logic 1014, display logic 1016, and/or determination logic 1018. Furthermore, computing device(s) 1000 may include components in addition to or in lieu of interaction logic 1002, display(s) 1004, camera(s) 1006, store 1008, identification logic 1010, association logic 1012, incorporation logic 1014, display logic 1016, and/or determination logic 1018.

Any one or more of remote interaction logic 128A-128N, local interaction logic 118, interaction logic 1002, display(s) 1004, camera(s) 1006, store 1008, identification logic 1010, association logic 1012, incorporation logic 1014, display logic 1016, determination logic 1018, flowchart 800, and/or flowchart 900 may be implemented in hardware, software, firmware, or any combination thereof.

For example, any one or more of remote interaction logic 128A-128N, local interaction logic 118, interaction logic 1002, display(s) 1004, camera(s) 1006, store 1008, identification logic 1010, association logic 1012, incorporation logic 1014, display logic 1016, determination logic 1018, flowchart 800, and/or flowchart 900 may be implemented, at least in part, as computer program code configured to be executed in one or more processors.

In another example, any one or more of remote interaction logic 128A-128N, local interaction logic 118, interaction logic 1002, display(s) 1004, camera(s) 1006, store 1008, identification logic 1010, association logic 1012, incorporation logic 1014, display logic 1016, determination logic 1018, flowchart 800, and/or flowchart 900 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method of providing a plurality of selectable interaction elements in a 360-degree video stream, a plurality of objects are automatically identified in a 360-degree view that is captured by a 360-degree video camera. The plurality of selectable interaction elements, which are configured to be incorporated into a 360-degree video stream that is generated from the 360-degree view, are associated with the plurality of respective objects. Each selectable interaction element is selectable to provide information pertaining to the object with which the respective selectable interaction element is associated. One or more selectable interaction elements of the plurality of selectable interaction elements are incorporated into at least a portion of the 360-degree video stream such that the one or more selectable interaction elements are positioned proximate one or more respective objects of the plurality of objects with which the one or more respective selectable interaction elements are associated.

In a first aspect of the example method, automatically identifying the plurality of objects comprises automatically identifying a plurality of local participants of a video conference in the 360-degree view. Each local participant is within a field of view of the 360-degree video camera. In accordance with the first aspect, associating the plurality of selectable interaction elements with the plurality of respective objects comprises associating a plurality of designated selectable interaction elements that are included in the plurality of selectable interaction elements with the plurality of local participants. Each designated selectable interaction element is selectable to provide information about the local participant with which the respective designated selectable interaction element is associated. In further accordance with the first aspect, incorporating the one or more selectable interaction elements into at least the portion of the 360-degree video stream comprises positioning one or more designated selectable interaction elements of the plurality of designated selectable interaction elements proximate one or more local participants of the plurality of local participants with whom the one or more respective designated selectable interaction elements are associated.

In an example of the first aspect of the example method, the example method further comprises determining that a first designated selectable interaction element of the plurality of designated selectable interaction elements that is associated with a first local participant of the plurality of local participants is selected by a remote participant. The remote participant is not in a field of view of the 360-degree video camera. In accordance with this example of the first aspect, the example method further comprises causing the information about the first local participant to be presented on a display of a computing device of the remote participant based on the remote participant selecting the first designated selectable interaction element.

In a second aspect of the example method, automatically identifying the plurality of objects comprises automatically identifying a plurality of local participants of a video conference in the 360-degree view. Each local participant is within a field of view of the 360-degree video camera. In accordance with the second aspect, associating the plurality of selectable interaction elements with the plurality of respective objects comprises associating a plurality of designated selectable interaction elements that are included in the plurality of selectable interaction elements with the plurality of local participants. Each designated selectable interaction element is selectable by a remote participant of the video conference to provide an interface configured to enable the remote participant to generate a message for delivery to the local participant with which the respective designated selectable interaction element is associated. The remote participant is not in the field of view of the 360-degree video camera. In further accordance with the second aspect, incorporating the one or more selectable interaction elements into at least the portion of the 360-degree video stream comprises positioning one or more designated selectable interaction elements of the plurality of designated selectable interaction elements proximate one or more local participants of the plurality of local participants with whom the one or more respective designated selectable interaction elements are associated. The second aspect of the example method may be implemented in combination with the first aspect of the example method, though the example embodiments are not limited in this respect.

In an example of the second aspect of the example method, the example method further comprises determining that a first designated selectable interaction element of the plurality of designated selectable interaction elements that is associated with a first local participant of the plurality of local participants is selected by the remote participant. In accordance with this example of the second aspect, the example method further comprises causing the interface to be provided on a display of a computing device of the remote participant based on the remote participant selecting the first designated selectable interface element. The interface enables the remote participant to generate the message for delivery to the first local participant.

In an implementation of this example of the second aspect of the example method, the example method further comprises causing the message to be delivered to a local computing device of the first local participant via a network for presentation on a display of the local computing device in response to the message being generated.

In a third aspect of the example method, the 360-degree view shows an environment within a field of view of the 360-degree video camera that includes a plurality of local participants of a video conference. In accordance with the third aspect, automatically identifying the plurality of objects comprises automatically identifying a second camera in the environment. In further accordance with the third aspect, associating the plurality of selectable interaction elements with the plurality of respective objects comprises associating a designated selectable interaction element of the plurality of selectable interaction elements with the second camera. The designated selectable interaction element is selectable to provide a video stream that is captured by the second camera. In further accordance with the third aspect, incorporating the one or more selectable interaction elements into at least the portion of the 360-degree video stream comprises positioning the designated selectable interaction element proximate the second camera. The third aspect of the example method may be implemented in combination with the first and/or second aspect of the example method, though the example embodiments are not limited in this respect In an example of the third aspect of the example method, the example method further comprises determining that the designated selectable interaction element is selected by a remote participant, the remote participant not being in a field of view of the 360-degree video camera. In accordance with this example of the third aspect, the example method further comprises causing the video stream that is captured by the second camera to be presented on a display of a computing device of the remote participant based on the remote participant selecting the designated selectable interaction element.

In a fourth aspect of the example method, the 360-degree view shows an environment within a field of view of the 360-degree video camera that includes a plurality of local participants of a video conference. In accordance with the fourth aspect, automatically identifying the plurality of objects comprises automatically identifying a display in the environment. In further accordance with the fourth aspect, associating the plurality of selectable interaction elements with the plurality of respective objects comprises associating a designated selectable interaction element of the plurality of selectable interaction elements with the display. The designated selectable interaction element is selectable to provide content that is configured to be presented via the display. In further accordance with the fourth aspect, incorporating the one or more selectable interaction elements into at least the portion of the 360-degree video stream comprises positioning the designated selectable interaction element proximate the display. The fourth aspect of the example method may be implemented in combination with the first, second, and/or third aspect of the example method, though the example embodiments are not limited in this respect.

In a first example of the fourth aspect of the example method, the example method further comprises determining that the designated selectable interaction element is selected by a remote participant. The remote participant is not in a field of view of the 360-degree video camera. In accordance with the first example of the fourth aspect, the example method further comprises causing the content to be presented on a second display of a computing device of the remote participant based on the remote participant selecting the designated selectable interaction element.

In a second example of the fourth aspect of the example method, the example method further comprises determining that the designated selectable interaction element is selected by a remote participant. The remote participant is not in a field of view of the 360-degree video camera. In accordance with the second example of the fourth aspect, the example method further comprises comparing the content, which is displayed on the display, and reference content that is stored in a store to determine that the content and the reference content are same. In further accordance with the second example of the fourth aspect, the example method further comprises causing the reference content from the store to be presented on a second display of a computing device of the remote participant while the content is being displayed on the display in the environment based on the remote participant selecting the designated selectable interaction element and further based on the content and the reference content being the same.

In a fifth aspect of the example method, the 360-degree view shows an environment within a field of view of the 360-degree video camera that includes a plurality of local participants of a video conference. In accordance with the fifth aspect, automatically identifying the plurality of objects comprises automatically identifying a display in the environment. In further accordance with the fifth aspect, associating the plurality of selectable interaction elements with the plurality of respective objects comprises associating a designated selectable interaction element of the plurality of selectable interaction elements with the display. The designated selectable interaction element is selectable by a remote participant of the video conference to provide an interface configured to enable the remote participant to provide input for presentation on the display. The remote participant is not in the field of view of the 360-degree video camera. In further accordance with the fifth aspect, incorporating the one or more selectable interaction elements into at least the portion of the 360-degree video stream comprises positioning the designated selectable interaction element proximate the display. The fifth aspect of the example method may be implemented in combination with the first, second, third, and/or fourth aspect of the example method, though the example embodiments are not limited in this respect.

In an example of the fifth aspect of the example method, the example method further comprises determining that the designated selectable interaction element is selected by the remote participant. In accordance with this example of the fifth aspect, the example method further comprises causing the interface to be provided on a second display of a computing device of the remote participant based on the remote participant selecting the designated selectable interaction element.

In an implementation of this example of the fifth aspect of the example method, the example method further comprises determining that the input is provided via the interface. In accordance with this implementation, the example method further comprises causing the input to be shown on the display in response to the determination.

In a sixth aspect of the example method, the 360-degree view shows an environment within a field of view of the 360-degree video camera that includes a plurality of local participants of a video conference. In accordance with the sixth aspect, automatically identifying the plurality of objects comprises automatically identifying a whiteboard in the environment. In further accordance with the sixth aspect, associating the plurality of selectable interaction elements with the plurality of respective objects comprises associating a designated selectable interaction element of the plurality of selectable interaction elements with the whiteboard. The designated selectable interaction element is selectable to provide an image of content that is written on the whiteboard. In further accordance with the sixth aspect, incorporating the one or more selectable interaction elements into at least the portion of the 360-degree video stream comprises positioning the designated selectable interaction element proximate the whiteboard. The sixth aspect of the example method may be implemented in combination with the first, second, third, fourth, and/or fifth aspect of the example method, though the example embodiments are not limited in this respect.

In an example of the sixth aspect of the example method, the example method further comprises determining that the designated selectable interaction element is selected by a remote participant. The remote participant is not in a field of view of the 360-degree video camera. In accordance with this example of the sixth aspect, the example method further comprises providing the image of the content for presentation on a display of a computing device of the remote participant based on the remote participant selecting the designated selectable interaction element.

In a seventh aspect of the example method, automatically identifying the plurality of objects in the 360-degree view comprises receiving a notification from an electronic device in the 360-degree view. The notification indicates presence of the electronic device. In accordance with the seventh aspect, automatically identifying the plurality of objects in the 360-degree view further comprises automatically identifying the electronic device in the 360-degree view based on receipt of the notification. The seventh aspect of the example method may be implemented in combination with the first, second, third, fourth, fifth, and/or sixth aspect of the example method, though the example embodiments are not limited in this respect.

In an eighth aspect of the example method, automatically identifying the plurality of objects in the 360-degree view comprises receiving a plurality of instances of identification information that identify a first plurality of respective persons from a store. In accordance with the eighth aspect, automatically identifying the plurality of objects in the 360-degree view further comprises comparing a plurality of images of a second plurality of persons who are in the 360-degree view and the plurality of instances of the identification information. The plurality of images is captured by the 360-degree video camera. The first plurality of persons includes the second plurality of persons. In further accordance with the eighth aspect, the comparing comprises matching each person of the second plurality of persons to a respective instance of the identification information to identify the respective person of the second plurality of persons. The eighth aspect of the example method may be implemented in combination with the first, second, third, fourth, fifth, sixth, and/or seventh aspect of the example method, though the example embodiments are not limited in this respect.

An example system to provide a plurality of selectable interaction elements in a 360-degree video stream comprises identification logic configured to automatically identify a plurality of objects in a 360-degree view that is captured by a 360-degree video camera. The example system further comprises association logic configured to associate the plurality of selectable interaction elements, which are configured to be incorporated into a 360-degree video stream that is generated from the 360-degree view, with the plurality of respective objects. Each selectable interaction element is configured to cause information pertaining to the object with which the respective selectable interaction element is associated to be provided in response to selection of the respective selectable interaction element. The example system further comprises incorporation logic configured to incorporate one or more selectable interaction elements of the plurality of selectable interaction elements into at least a portion of the 360-degree video stream such that the one or more selectable interaction elements are positioned proximate one or more respective objects of the plurality of objects with which the one or more respective selectable interaction elements are associated.

In a first aspect of the example system, the identification logic is configured to automatically identify a plurality of local participants of a video conference in the 360-degree view. Each local participant is within a field of view of the 360-degree video camera. In accordance with the first aspect, the association logic is configured to associate a plurality of designated selectable interaction elements that are included in the plurality of selectable interaction elements with the plurality of local participants. Each designated selectable interaction element is configured to cause information about the local participant with which the respective designated selectable interaction element is associated to be provided in response to selection of the respective designated selectable interaction element. In further accordance with the first aspect, the incorporation logic is configured to incorporate the one or more selectable interaction elements of the plurality of selectable interaction elements into at least the portion of the 360-degree video stream such that one or more designated selectable interaction elements of the plurality of designated selectable interaction elements are positioned proximate one or more local participants of the plurality of local participants with whom the one or more respective designated selectable interaction elements are associated.

In an example of the first aspect of the example system, the example system further comprises determination logic configured to determine whether a first designated selectable interaction element of the plurality of designated selectable interaction elements that is associated with a first local participant of the plurality of local participants is selected by a remote participant, the remote participant not being in a field of view of the 360-degree video camera. In accordance with this example of the first aspect, the example system further comprises display logic configured to cause the information about the first local participant to be presented on a display of a computing device of the remote participant in response to a determination that the remote participant selects the first designated selectable interaction element.

In a second aspect of the example system, the identification logic is configured to automatically identify a plurality of local participants of a video conference in the 360-degree view. Each local participant is within a field of view of the 360-degree video camera. In accordance with the second aspect, the association logic is configured to associate a plurality of designated selectable interaction elements that are included in the plurality of selectable interaction elements with the plurality of local participants. Each designated selectable interaction element is configured to cause an interface, which is configured to enable a remote participant of the video conference to generate a message for delivery to the local participant with which the respective designated selectable interaction element is associated, to be provided in response to selection of the respective designated selectable interaction element by the remote participant. The remote participant is not in the field of view of the 360-degree video camera. In further accordance with the second aspect, the incorporation logic is configured to incorporate the one or more selectable interaction elements of the plurality of selectable interaction elements into at least the portion of the 360-degree video stream such that one or more designated selectable interaction elements of the plurality of designated selectable interaction elements are positioned proximate one or more local participants of the plurality of local participants with whom the one or more respective designated selectable interaction elements are associated. The second aspect of the example system may be implemented in combination with the first aspect of the example system, though the example embodiments are not limited in this respect.

In an example of the second aspect of the example system, the example system further comprises determination logic configured to determine whether a first designated selectable interaction element of the plurality of designated selectable interaction elements that is associated with a first local participant of the plurality of local participants is selected by the remote participant. In accordance with this example of the second aspect, the example system further comprises display logic configured to cause the interface to be provided on a display of a computing device of the remote participant in response to a determination that the remote participant selects the first designated selectable interface element. The interface enables the remote participant to generate the message for delivery to the first local participant.

In an implementation of this example of the second aspect of the example system, the display logic is further configured to cause the message to be delivered to a local computing device of the first local participant via a network for presentation on a display of the local computing device in response to the message being generated.

In a third aspect of the example system, the 360-degree view shows an environment within a field of view of the 360-degree video camera that includes a plurality of local participants of a video conference. In accordance with the third aspect, the identification logic is configured to automatically identify a second camera in the environment. In further accordance with the third aspect, the association logic is configured to associate a designated selectable interaction element of the plurality of selectable interaction elements with the second camera. The designated selectable interaction element is configured to cause a video stream that is captured by the second camera to be provided in response to selection of the designated selectable interaction element. In further accordance with the third aspect, the incorporation logic is configured to incorporate the one or more selectable interaction elements of the plurality of selectable interaction elements into at least the portion of the 360-degree video stream such that the designated selectable interaction element is positioned proximate the second camera. The third aspect of the example system may be implemented in combination with the first and/or second aspect of the example system, though the example embodiments are not limited in this respect.

In an example of the third aspect of the example system, the example system further comprises determination logic configured to determine whether the designated selectable interaction element is selected by a remote participant. The remote participant is not in a field of view of the 360-degree video camera. In accordance with this example of the third aspect, the example system further comprises display logic configured to cause the video stream that is captured by the second camera to be presented on a display of a computing device of the remote participant in response to a determination that the remote participant selects the designated selectable interaction element.

In a fourth aspect of the example system, the 360-degree view shows an environment within a field of view of the 360-degree video camera that includes a plurality of local participants of a video conference. In accordance with the fourth aspect, the identification logic is configured to automatically identify a display in the environment. In further accordance with the fourth aspect, the association logic is configured to associate a designated selectable interaction element of the plurality of selectable interaction elements with the display. The designated selectable interaction element is configured to cause content that is configured to be presented via the display to be provided in response to selection of the designated selectable interaction element. In further accordance with the fourth aspect, the incorporation logic is configured to incorporate the one or more selectable interaction elements of the plurality of selectable interaction elements into at least the portion of the 360-degree video stream such that the designated selectable interaction element is positioned proximate the display. The fourth aspect of the example system may be implemented in combination with the first, second, and/or third aspect of the example system, though the example embodiments are not limited in this respect.

In a first example of the fourth aspect of the example system, the example system further comprises determination logic configured to determine whether the designated selectable interaction element is selected by a remote participant. The remote participant is not in a field of view of the 360-degree video camera. In accordance with the first example of the fourth aspect, the example system further comprises display logic configured to cause the content to be presented on a second display of a computing device of the remote participant in response to a determination that the remote participant selects the designated selectable interaction element.

In a second example of the fourth aspect of the example system, the example system further comprises determination logic configured to determine whether the designated selectable interaction element is selected by a remote participant. The remote participant is not in a field of view of the 360-degree video camera. The determination logic is further configured to compare the content, which is displayed on the display, and reference content that is stored in a store to determine whether the content and the reference content are same. In accordance with the second example of the fourth aspect, the example system further comprises display logic configured to cause the reference content from the store to be presented on a second display of a computing device of the remote participant while the content is being displayed on the display in the environment in response to a determination that the remote participant selects the designated selectable interaction element and further in response to a determination that the content and the reference content are the same.

In a fifth aspect of the example system, the 360-degree view shows an environment within a field of view of the 360-degree video camera that includes a plurality of local participants of a video conference. In accordance with the fifth aspect, the identification logic is configured to automatically identify a display in the environment. In further accordance with the fifth aspect, the association logic is configured to associate a designated selectable interaction element of the plurality of selectable interaction elements with the display. The designated selectable interaction element is configured to cause an interface, which is configured to enable a remote participant of the video conference to provide input for presentation on the display, to be provided in response to selection of the designated selectable interaction element by the remote participant. The remote participant is not in the field of view of the 360-degree video camera. In further accordance with the fifth aspect, the incorporation logic is configured to incorporate the one or more selectable interaction elements of the plurality of selectable interaction elements into at least the portion of the 360-degree video stream such that the designated selectable interaction element is positioned proximate the display. The fifth aspect of the example system may be implemented in combination with the first, second, third, and/or fourth aspect of the example system, though the example embodiments are not limited in this respect.

In an example of the fifth aspect of the example system, the example system further comprises determination logic configured to determine whether the designated selectable interaction element is selected by the remote participant. In accordance with this example of the fifth aspect, the example system further comprises display logic configured to cause the interface to be provided on a second display of a computing device of the remote participant in response to a determination that the remote participant selects the designated selectable interaction element.

In an implementation of this example of the fifth aspect of the example system, the determination logic is configured to determine whether the input is provided via the interface. In accordance with this implementation, the display logic is configured to cause the input to be shown on the display in response to a determination that the input is provided via the interface.

In a sixth aspect of the example system, the 360-degree view shows an environment within a field of view of the 360-degree video camera that includes a plurality of local participants of a video conference. In accordance with the sixth aspect, the identification logic is configured to automatically identify a whiteboard in the environment. In further accordance with the sixth aspect, the association logic is configured to associate a designated selectable interaction element of the plurality of selectable interaction elements with the whiteboard, the designated selectable interaction element is configured to cause an image of content that is written on the whiteboard to be provided in response to selection of the designated selectable interaction element. In further accordance with the sixth aspect, the incorporation logic is configured to incorporate the one or more selectable interaction elements of the plurality of selectable interaction elements into at least the portion of the 360-degree video stream such that the designated selectable interaction element is positioned proximate the whiteboard. The sixth aspect of the example system may be implemented in combination with the first, second, third, fourth, and/or fifth aspect of the example system, though the example embodiments are not limited in this respect.

In an example of the sixth aspect of the example system, the example system further comprises determination logic configured to determine whether the designated selectable interaction element is selected by a remote participant, the remote participant not being in a field of view of the 360-degree video camera. In accordance with this example of the sixth aspect, the incorporation logic is configured to provide the image of the content for presentation on a display of a computing device of the remote participant in response to a determination that the remote participant selects the designated selectable interaction element.

In a seventh aspect of the example system, the identification logic is configured to automatically identify an electronic device in the 360-degree view based on receipt of a notification from the electronic device. The notification indicates presence of the electronic device. The seventh aspect of the example system may be implemented in combination with the first, second, third, fourth, fifth, and/or sixth aspect of the example system, though the example embodiments are not limited in this respect.

In an eighth aspect of the example system, the identification logic is configured to retrieve a plurality of instances of identification information from a store. In accordance with the eighth aspect, the identification logic is configured to compare a plurality of images of a second plurality of persons who are in the 360-degree view and the plurality of instances of the identification information. The identification logic is configured to match each person of the second plurality of persons to a respective instance of the identification information to identify the respective person of the second plurality of persons. In further accordance with the eighth aspect, the plurality of images is captured by the 360-degree video camera. In further accordance with the eighth aspect, the first plurality of persons includes the second plurality of persons. The eighth aspect of the example system may be implemented in combination with the first, second, third, fourth, fifth, sixth, and/or seventh aspect of the example system, though the example embodiments are not limited in this respect.

An example computer program product comprises a computer-readable storage medium having computer program logic recorded thereon for enabling a processor-based system to provide a plurality of selectable interaction elements in a 360-degree video stream. The computer program logic comprises first program logic for enabling the processor-based system to automatically identify a plurality of objects in a 360-degree view that is captured by a 360-degree video camera. The computer program logic further comprises second program logic for enabling the processor-based system to associate the plurality of selectable interaction elements, which are configured to be incorporated into a 360-degree video stream that is generated from the 360-degree view, with the plurality of respective objects. Each selectable interaction element is configured to cause information pertaining to the object with which the respective selectable interaction element is associated to be provided in response to selection of the respective selectable interaction element. The computer program logic further comprises third program logic for enabling the processor-based system to incorporate one or more selectable interaction elements of the plurality of selectable interaction elements into at least a portion of the 360-degree video stream such that the one or more selectable interaction elements are positioned proximate one or more respective objects of the plurality of objects with which the one or more respective selectable interaction elements are associated.

IV. Example Computer System

Figure 11:
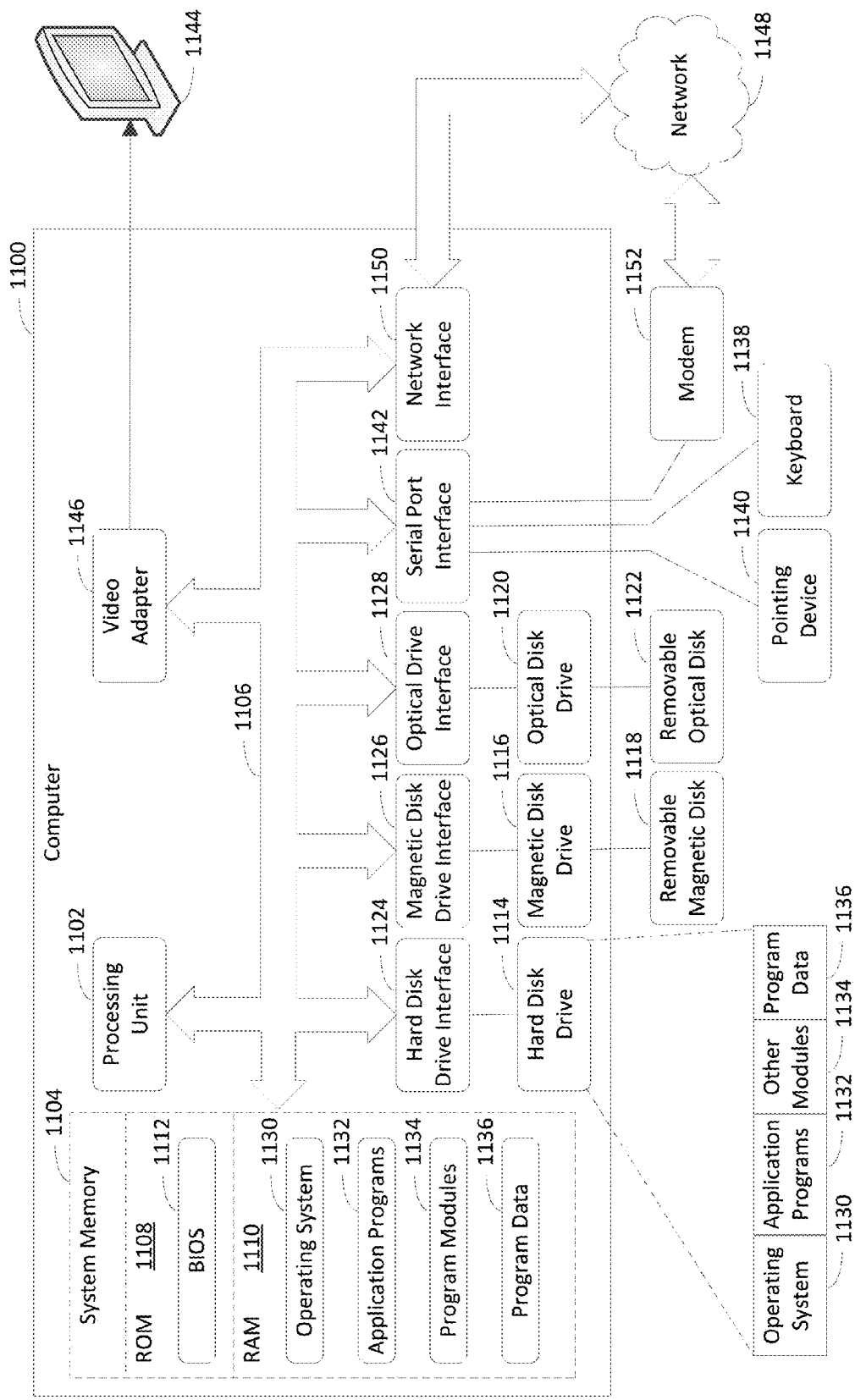
FIG. 11 depicts an example computer in which embodiments may be implemented.

FIG. 11 depicts an example computer 1100 in which embodiments may be implemented. Any one or more of remote computing devices 106A-106N and/or local computing device 102 shown in FIG. 1; computing device 200 shown in FIG. 2; computing device 300 shown in FIG. 3; computing device 400 shown in FIG. 4; computing device 500 shown in FIG. 5; computing device 600 shown in FIG. 6; computing device 700 shown in FIG. 7; and/or any one or more of computing device(s) 1000 shown in FIG. 10 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of remote interaction logic 128A-128N, local interaction logic 118, interaction logic 1002, display(s) 1004, camera(s) 1006, store 1008, identification logic 1010, association logic 1012, incorporation logic 1014, display logic 1016, determination logic 1018, flowchart 800 (including any step of flowchart 800), and/or flowchart 900 (including any step of flowchart 900), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method of providing a plurality of selectable interaction elements in a 360-degree video stream, the method comprising:
   automatically identifying a plurality of objects in a 360-degree view that is captured by a 360-degree video camera;
   associating the plurality of selectable interaction elements, which are configured to be incorporated into the 360-degree video stream that is generated from the 360-degree view, with the plurality of respective objects, the plurality of selectable interaction elements are selectable to initiate retrieval of information pertaining to the objects with which the respective selectable interaction elements are associated from a store independently from information pertaining to the other objects; and
   incorporating one or more of the selectable interaction elements into at least a portion of the 360-degree video stream such that the one or more selectable interaction elements are positioned proximate one or more respective objects of the plurality of objects with which the one or more respective selectable interaction elements are associated.

2. The method of claim 1, wherein automatically identifying the plurality of objects comprises:
   automatically identifying a plurality of local participants of a video conference in the 360-degree view, each local participant is within a field of view of the 360-degree video camera;
   wherein associating the plurality of selectable interaction elements with the plurality of respective objects comprises:
      associating a plurality of designated selectable interaction elements that are included in the plurality of selectable interaction elements with the plurality of local participants, each designated selectable interaction element is selectable to provide information about the local participant with which the respective designated selectable interaction element is associated; and
   wherein incorporating the one or more selectable interaction elements into at least the portion of the 360-degree video stream comprises:
      positioning one or more designated selectable interaction elements of the plurality of designated selectable interaction elements proximate one or more local participants of the plurality of local participants with whom the one or more respective designated selectable interaction elements are associated.

3. The method of claim 2, further comprising:
   determining that a first designated selectable interaction element of the plurality of designated selectable interaction elements that is associated with a first local participant of the plurality of local participants is selected by a remote participant, the remote participant not being in a field of view of the 360-degree video camera; and
   causing the information about the first local participant to be presented on a display of a computing device of the remote participant based on the remote participant selecting the first designated selectable interaction element.

4. The method of claim 1, wherein the 360-degree view shows an environment within a field of view of the 360-degree video camera that includes a plurality of local participants of a video conference;
   wherein automatically identifying the plurality of objects comprises:
      automatically identifying a second camera in the environment;
   wherein associating the plurality of selectable interaction elements with the plurality of respective objects comprises:
      associating a designated selectable interaction element of the plurality of selectable interaction elements with the second camera, the designated selectable interaction element is selectable to provide a video stream that is captured by the second camera; and
   wherein incorporating the one or more selectable interaction elements into at least the portion of the 360-degree video stream comprises:
      positioning the designated selectable interaction element proximate the second camera.

5. The method of claim 4, further comprising:
   determining that the designated selectable interaction element is selected by a remote participant, the remote participant not being in a field of view of the 360-degree video camera; and
   causing the video stream that is captured by the second camera to be presented on a display of a computing device of the remote participant based on the remote participant selecting the designated selectable interaction element.

6. The method of claim 1, wherein the 360-degree view shows an environment within a field of view of the 360-degree video camera that includes a plurality of local participants of a video conference;
   wherein automatically identifying the plurality of objects comprises:
      automatically identifying a whiteboard in the environment;
   wherein associating the plurality of selectable interaction elements with the plurality of respective objects comprises:
      associating a designated selectable interaction element of the plurality of selectable interaction elements with the whiteboard, the designated selectable interaction element is selectable to provide an image of content that is written on the whiteboard; and
   wherein incorporating the one or more selectable interaction elements into at least the portion of the 360-degree video stream comprises:
      positioning the designated selectable interaction element proximate the whiteboard.

7. The method of claim 6, further comprising:
   determining that the designated selectable interaction element is selected by a remote participant, the remote participant not being in a field of view of the 360-degree video camera; and
   providing the image of the content for presentation on a display of a computing device of the remote participant based on the remote participant selecting the designated selectable interaction element.

8. The method of claim 1, wherein automatically identifying the plurality of objects in the 360-degree view comprises:
   receiving a plurality of instances of identification information that identify a first plurality of respective persons from a store; and comparing a plurality of images of a second plurality of persons who are in the 360-degree view and the plurality of instances of the identification information, the plurality of images is captured by the 360-degree video camera, the first plurality of persons includes the second plurality of persons, the comparing comprising:
matching each person of the second plurality of persons to a respective instance of the identification information to identify the respective person of the second plurality of persons.

9. A system to provide a plurality of selectable interaction elements in a 360-degree video stream, the system comprising:
identification logic configured to automatically identify a plurality of objects in a 360-degree view that is captured by a 360-degree video camera;
association logic configured to associate the plurality of selectable interaction elements, which are configured to be incorporated into the 360-degree video stream that is generated from the 360-degree view, with the plurality of respective objects, the plurality of selectable interaction elements are selectable to initiate retrieval of information pertaining to the objects with which the respective selectable interaction elements are associated from a store independently from information pertaining to the other objects; and
incorporation logic configured to incorporate one or more of the selectable interaction elements into at least a portion of the 360-degree video stream such that the one or more selectable interaction elements are positioned proximate one or more respective objects of the plurality of objects with which the one or more respective selectable interaction elements are associated.

10. The system of claim 9, wherein the identification logic is configured to automatically identify a plurality of local participants of a video conference in the 360-degree view, each local participant is within a field of view of the 360-degree video camera;
wherein the association logic is configured to associate a plurality of designated selectable interaction elements that are included in the plurality of selectable interaction elements with the plurality of local participants, each designated selectable interaction element is configured to cause an interface, which is configured to enable a remote participant of the video conference to generate a message for delivery to the local participant with which the respective designated selectable interaction element is associated, to be provided in response to selection of the respective designated selectable interaction element by the remote participant, the remote participant is not in the field of view of the 360-degree video camera; and
wherein the incorporation logic is configured to incorporate the one or more selectable interaction elements of the plurality of selectable interaction elements into at least the portion of the 360-degree video stream such that one or more designated selectable interaction elements of the plurality of designated selectable interaction elements are positioned proximate one or more local participants of the plurality of local participants with whom the one or more respective designated selectable interaction elements are associated.

11. The system of claim 10, further comprising:
determination logic configured to determine whether a first designated selectable interaction element of the plurality of designated selectable interaction elements that is associated with a first local participant of the plurality of local participants is selected by the remote participant; and
display logic configured to cause the interface to be provided on a display of a computing device of the remote participant in response to a determination that the remote participant selects the first designated selectable interface element, the interface enabling the remote participant to generate the message for delivery to the first local participant.

12. The system of claim 11, wherein the display logic is further configured to cause the message to be delivered to a local computing device of the first local participant via a network for presentation on a display of the local computing device in response to the message being generated.

13. The system of claim 9, wherein the 360-degree view shows an environment within a field of view of the 360-degree video camera that includes a plurality of local participants of a video conference;
wherein the identification logic is configured to automatically identify a display in the environment;
wherein the association logic is configured to associate a designated selectable interaction element of the plurality of selectable interaction elements with the display, the designated selectable interaction element is configured to cause content that is configured to be presented via the display to be provided in response to selection of the designated selectable interaction element; and
wherein the incorporation logic is configured to incorporate the one or more selectable interaction elements of the plurality of selectable interaction elements into at least the portion of the 360-degree video stream such that the designated selectable interaction element is positioned proximate the display.

14. The system of claim 13, further comprising:
determination logic configured to determine whether the designated selectable interaction element is selected by a remote participant, the remote participant not being in a field of view of the 360-degree video camera; and
display logic configured to cause the content to be presented on a second display of a computing device of the remote participant in response to a determination that the remote participant selects the designated selectable interaction element.

15. The system of claim 13, further comprising:
determination logic configured to determine whether the designated selectable interaction element is selected by a remote participant, the remote participant not being in a field of view of the 360-degree video camera,
the determination logic further configured to compare the content, which is displayed on the display, and reference content that is stored in a store to determine whether the content and the reference content are same; and
display logic configured to cause the reference content from the store to be presented on a second display of a computing device of the remote participant while the content is being displayed on the display in the environment in response to a determination that the remote participant selects the designated selectable interaction element and further in response to a determination that the content and the reference content are the same.

16. The system of claim 9, wherein the 360-degree view shows an environment within a field of view of the 360-degree video camera that includes a plurality of local participants of a video conference;

wherein the identification logic is configured to automatically identify a display in the environment;
wherein the association logic is configured to associate a designated selectable interaction element of the plurality of selectable interaction elements with the display, the designated selectable interaction element is configured to cause an interface, which is configured to enable a remote participant of the video conference to provide input for presentation on the display, to be provided in response to selection of the designated selectable interaction element by the remote participant, the remote participant is not in the field of view of the 360-degree video camera; and
wherein the incorporation logic is configured to incorporate the one or more selectable interaction elements of the plurality of selectable interaction elements into at least the portion of the 360-degree video stream such that the designated selectable interaction element is positioned proximate the display.

17. The system of claim 16, further comprising:
determination logic configured to determine whether the designated selectable interaction element is selected by the remote participant; and
display logic configured to cause the interface to be provided on a second display of a computing device of the remote participant in response to a determination that the remote participant selects the designated selectable interaction element.

18. The system of claim 17, wherein the determination logic is configured to determine whether the input is provided via the interface; and
wherein the display logic is configured to cause the input to be shown on the display in response to a determination that the input is provided via the interface.

19. The system of claim 9, wherein the identification logic is configured to automatically identify an electronic device in the 360-degree view based on receipt of a notification from the electronic device, the notification indicating presence of the electronic device.

20. A computer program product comprising a computer-readable device having computer program logic recorded thereon for enabling a processor-based system to provide a plurality of selectable interaction elements in a 360-degree video stream, the computer program logic comprising:
first program logic for enabling the processor-based system to automatically identify a plurality of objects in a 360-degree view that is captured by a 360-degree video camera;
second program logic for enabling the processor-based system to associate the plurality of selectable interaction elements, which are configured to be incorporated into the 360-degree video stream that is generated from the 360-degree view, with the plurality of respective objects, the plurality of selectable interaction elements are selectable to initiate retrieval of information pertaining to the objects with which the respective selectable interaction elements are associated from a store independently from information pertaining to the other objects; and
third program logic for enabling the processor-based system to incorporate one or more of the selectable interaction elements into at least a portion of the 360-degree video stream such that the one or more selectable interaction elements are positioned proximate one or more respective objects of the plurality of objects with which the one or more respective selectable interaction elements are associated.

* * * * *